(12) United States Patent
Hosseini et al.

(10) Patent No.: US 11,976,370 B2
(45) Date of Patent: May 7, 2024

(54) APPARATUS AND METHOD OF CATALYSIS

(71) Applicant: Manufacturing Systems Limited, Auckland (NZ)

(72) Inventors: Ali Hosseini, Auckland (NZ); Ashton Cyril Partridge, Auckland (NZ); Andrew Leo Haynes, Auckland (NZ)

(73) Assignee: Manufacturing Systems Limited, Auckland (NZ)

( * ) Notice: Subject to any disclaimer, the term of this patent is extended or adjusted under 35 U.S.C. 154(b) by 878 days.

(21) Appl. No.: 16/975,777

(22) PCT Filed: Feb. 28, 2019

(86) PCT No.: PCT/IB2019/051640
§ 371 (c)(1),
(2) Date: Aug. 26, 2020

(87) PCT Pub. No.: WO2019/166999
PCT Pub. Date: Sep. 6, 2019

(65) Prior Publication Data
US 2020/0407857 A1  Dec. 31, 2020

Related U.S. Application Data

(60) Provisional application No. 62/636,814, filed on Feb. 28, 2018.

(51) Int. Cl.
*C25B 11/02* (2021.01)
*C25B 1/04* (2021.01)
(Continued)

(52) U.S. Cl.
CPC ............... *C25B 11/02* (2013.01); *C25B 1/04* (2013.01); *C25B 1/30* (2013.01); *C25B 3/23* (2021.01);
(Continued)

(58) Field of Classification Search
CPC ............ C25B 11/02; C25B 1/04; C25B 11/00
See application file for complete search history.

(56) References Cited

U.S. PATENT DOCUMENTS 3,350,232 A   10/1967   Ryhiner et al.
6,036,827 A    3/2000   Andrews et al.
(Continued)

FOREIGN PATENT DOCUMENTS

JP   09-279381 A    10/1997
JP   2005-522828 A   7/2005
(Continued)

OTHER PUBLICATIONS

International Search Report and Written Opinion for International Patent Application No. PCT/IB2019/051640 dated Jun. 6, 2019.
(Continued)

*Primary Examiner* — Nicholas A Smith
(74) *Attorney, Agent, or Firm* — Foley & Lardner LLP

(57) ABSTRACT

This invention relates to a method of selection of an electrocatalyst array for a desired product outcome. The method comprises exposing an electrocatalyst system to an active agent dissolved or suspended in a conductive solution; and applying a voltage to the electrocatalyst system. The voltage sufficient to cause a multi-electron oxidation or multi-electron reduction of the active species; the electrocatalyst system comprises a counter electrode; and an electrocatalyst array. The array comprising a support substrate; uniformly sized surface structures protruding from a surface of the support substrate; the uniformly sized surface structures have edges and/or apices comprising a catalyst. When the uniformly sized surface structures are of a micrometer scale a first product ratio is produced, when the uniformly sized surface structures are of a nanometer scale a second product ratio is produced, wherein the first and second product ratios are different; the second product ratio requires a higher order electron process compared to producing the first product ratio.

46 Claims, 20 Drawing Sheets

(51) Int. Cl.
  *C25B 1/30* (2006.01)
  *C25B 3/23* (2021.01)
  *C25B 3/25* (2021.01)
  *C25B 11/051* (2021.01)
  *C25B 11/093* (2021.01)
  *H01M 4/88* (2006.01)
  *H01M 4/90* (2006.01)
  *H01M 4/92* (2006.01)

(52) U.S. Cl.
  CPC .............. *C25B 3/25* (2021.01); *C25B 11/051* (2021.01); *C25B 11/093* (2021.01); *H01M 4/8803* (2013.01); *H01M 4/9075* (2013.01); *H01M 4/92* (2013.01); *H01M 4/8825* (2013.01)

(56) References Cited

U.S. PATENT DOCUMENTS

| | | | |
|---|---|---|---|
| 7,438,790 | B2 | 10/2008 | Hosonuma et al. |
| 10,062,520 | B2 | 8/2018 | Kitagawa et al. |
| 11,047,053 | B1* | 6/2021 | Anderson ............. C25B 11/042 |
| 2006/0001012 | A1 | 1/2006 | Suzuki et al. |
| 2006/0102492 | A1 | 5/2006 | Corradi et al. |
| 2013/0213462 | A1 | 8/2013 | Lewis et al. |
| 2014/0342128 | A1* | 11/2014 | Haynes .............. G01N 27/3275 205/78 |
| 2015/0083605 | A1 | 3/2015 | Tamura et al. |
| 2015/0308003 | A1 | 10/2015 | Gulla |
| 2017/0253978 | A1 | 9/2017 | Tamura et al. |

FOREIGN PATENT DOCUMENTS

| | | |
|---|---|---|
| JP | 2007-039742 A | 2/2007 |
| JP | 2017-155332 A | 9/2017 |
| JP | 6239733 B2 | 11/2017 |
| WO | WO-03/086628 A1 | 10/2003 |
| WO | WO-2011/129710 A1 | 10/2011 |
| WO | WO-2013/055234 A1 | 4/2013 |
| WO | WO-2015/146012 A1 | 10/2015 |
| WO | WO-2018/106128 A1 | 6/2018 |
| WO | WO-2018/106129 A1 | 6/2018 |

OTHER PUBLICATIONS

Extended European Search Report for European Patent Application No. 19760855.7 dated Oct. 27, 2021 (10 pages).

* cited by examiner

APPARATUS AND METHOD OF CATALYSIS

CROSS-REFERENCE TO RELATED APPLICATIONS

This application is a U.S. 371 National Stage Application of PCT/IB2019/051640, filed Feb. 28, 2019, which claims the benefit of U.S. Provisional Application No. 62/636,814 filed Feb. 28, 2019, the entire disclosures of which are hereby incorporated by reference.

FIELD OF INVENTION

The invention relates to a method of catalysing an electrochemical redox reaction. More particularly, the invention relates to a method of catalysing an electrochemical redox reaction using a electrocatalyst with surface structure(s) which can reduce the costs associated with normally expensive catalytic materials.

BACKGROUND OF THE INVENTION

Heterogeneous catalysis is used in a range of important redox catalytic processes including $H_2$ production for energy storage, and $O_2$ reduction in fuel cells. However, catalysts are often expensive materials. For a given electro catalytic reaction, it is desirable to have the catalytic reaction occurring at potentials as close as possible to the reversible electrode potential (thermodynamic electrode potential) with a satisfactory reaction rate. Typically, however, improving one aspect of the catalytic process has detrimental effect on the other, for example improving the reaction rate will often require a larger driving force and as a result a large deviation from the thermodynamic potential.

When optimising a catalytic process multiple parameters are considered including: the catalytic material, the solvent employed (e.g. aqueous, organic solvent), the solution characteristics (e.g. pH, viscosity, and electrolyte), flowing vs static, cell design, electrode material shape and orientation. A major component is the electrode which includes the catalyst either on the surface, or within the bulk of the electrode matrix. Alternatively, in the instance of a metal the electrode material may also be the catalytic material.

The process of optimising the catalyst typically includes optimising each of the above parameters in terms of the effect on the kinetic and thermodynamic response within the system, and gives an understanding of how each variable effects the catalytic efficiency in terms of speed and energy required. However, until now very little consideration has been given as to the effect of the topography of the electrode surface on the catalytic efficiency.

It is an object of the invention to provide a method of catalysing an electrochemical redox reaction of an active species in a conductive solution. It is an object of the invention to lower the cost of catalysing an electrochemical redox reaction of an active species in a conductive solution. Alternatively, it is an object of the invention to at least provide a useful choice to the public.

SUMMARY OF THE INVENTION

According to a first aspect of the invention, there is provided a method of catalysing an electrochemical redox reaction of an active species in a conductive solution, the method comprising the steps of:

a. providing an electrocatalyst array comprising:
  i. a support substrate;
  ii. surface structures protruding from the support substrate wherein the surface structures include an electrocatalyst;
  iii. a functional surface on the electrocatalyst, wherein the functional surface is on an upper portion of the surface structures and wherein the functional surface is adapted to contact an active species in the conductive solution;
b. exposing the surface structures to the solution and comprising a counter electrode therein; and
c. establishing a current or voltage between the electrocatalyst and the counter electrode such that the charge density (voltage or current) is focussed at the functional surfaces and the active species undergoes the redox reaction following contact with the functional surfaces.

In some embodiments, wherein the redox reaction is selected from one or more of the following: hydrogen evolution from water,
  oxygen evolution from water,
  hydrogen evolution from water,
  hydrogen evolution from protons,
  hydrogen oxidation to water,
  hydrogen oxidation to protons,
  hydrogen oxidation to hydrogen peroxide,
  oxygen reduction to water,
  oxygen reduction to peroxide,
  carbon dioxide to carbon monoxide,
  carbon dioxide to methanol,
  carbon dioxide to carboxylic acid (for example, formic acid),
  carbon dioxide to aldehyde and/or ketone,
  carbon dioxide to methane, ethane, propane and/or higher order carbon chains up to $C_{21}$,
  methane oxidation to methanol,
  nitrogen to hydrazine,
  nitrogen to ammonia,
  ammonia split to hydrogen and nitrogen,
  methane to methanol
  nitrate to nitrogen
  nitrate to ammonia.

In some embodiments, the redox reaction is a combination of the redox reactions. For example, hydrogen and oxygen evolution from water followed by oxygen reduction back to water; hydrogen evolution from water followed by combining the hydrogen with nitrogen to ammonia.

In some embodiments, the redox reaction encompasses a number of steps, wherein an intermediate is preferably not isolated. For example, carbon dioxide to carbon monoxide followed by carbon monoxide to methanol, wherein the carbon monoxide is not isolated.

In some embodiments, the redox reaction is a 2 or more electron process. In some embodiments, the redox reaction is a 2 electron process. In some embodiments, the 2 electron process is selected from:
  hydrogen evolution from water
  hydrogen evolution from protons
  hydrogen oxidation to hydrogen peroxide
  oxygen reduction to hydrogen peroxide
  carbon dioxide to carbon monoxide
  carbon dioxide to formic acid
  methane to methanol.

In some embodiments, the redox reaction is a 4 or more electron process. In some embodiments, the redox reaction is a 4 electron process. In some embodiments, the 4 electron process is selected from:
- oxygen evolution from water
- oxygen reduction to water
- nitrogen to hydrazine
- carbon dioxide to formaldehyde
- hydrogen oxidation to water.

In some embodiments, the redox reaction is a 6 or more electron process. In some embodiments, the 6 electron process is selected from:
- carbon dioxide to methanol,
- nitrogen to ammonia,
- ammonia split to hydrogen and nitrogen.

In some embodiments, the redox reaction is an 8 electron or higher process. In some embodiments, the 8 electron or higher process is selected from:
- carbon dioxide to methane, ethane, propane and/or higher order carbon chains up to C21;
- carbon dioxide to acetic acid,
- carbon dioxide to ketone,
- nitrate to nitrogen,
- nitrate to ammonia.

In another aspect, there is provided a method of catalysing an electrochemical redox reaction of an active species in a conductive solution, the method comprising the steps of:
  a. providing an electrocatalyst array comprising:
    i. a support substrate;
    ii. surface structures protruding from the support substrate wherein the surface structures include an electrocatalyst;
    iii. a functional surface on the electrocatalyst, wherein the functional surface is on an upper portion of the surface structures and wherein the functional surface is adapted to contact an active species in the conductive solution;
  b. exposing the surface structures to the solution and comprising a counter electrode therein; and
  c. establishing a current or voltage between the electrocatalyst and the counter electrode such that the charge density (voltage or current) is focussed at the functional surfaces and the active species undergoes the redox reaction following contact with the functional surfaces,
  wherein the active species is oxygen and the oxygen is reduced to water.

In another aspect, there is provided a method of catalysing an electrochemical redox reaction of an active species in a conductive solution, the method comprising the steps of:
  a. providing an electrocatalyst array comprising:
    i. a support substrate;
    ii. surface structures protruding from the support substrate wherein the surface structures include an electrocatalyst;
    iii. a functional surface on the electrocatalyst, wherein the functional surface is on an upper portion of the surface structures and wherein the functional surface is adapted to contact an active species in the conductive solution;
  b. exposing the surface structures to the solution and including a counter electrode therein; and
  c. establishing a current or voltage between the electrocatalyst and the counter electrode such that the charge density (voltage or current) is focussed at the functional surfaces and the active species undergoes the redox reaction following contact with the functional surfaces,
  wherein the active species is water or protons and the water or protons are reduced to hydrogen.

In another aspect, there is provided a method of catalysing an electrochemical redox reaction of an active species in a conductive solution, the method including the steps of:
  a. providing an electrocatalyst array comprising:
    i. a support substrate;
    ii. surface structures protruding from the support substrate wherein the surface structures include an electrocatalyst;
    iii. a functional surface on the electrocatalyst, wherein the functional surface is on an upper portion of the surface structures and wherein the functional surface is adapted to contact an active species in the conductive solution;
  b. exposing the surface structures to the solution and including a counter electrode therein; and
  c. establishing a current or voltage between the electrocatalyst and the counter electrode such that the charge density (voltage or current) is focussed at the functional surfaces and the active species undergoes the redox reaction following contact with the functional surfaces,
  wherein the active species is nitrogen and the nitrogen is reduced to ammonia.

In another aspect, there is provided a method of catalysing an electrochemical redox reaction of an active species in a conductive solution, the method including the steps of:
  a. providing an electrocatalyst array comprising:
    i. a support substrate;
    ii. surface structures protruding from the support substrate wherein the surface structures include an electrocatalyst;
    iii. a functional surface on the electrocatalyst, wherein the functional surface is on an upper portion of the surface structures and wherein the functional surface is adapted to contact an active species in the conductive solution;
  b. exposing the surface structures to the solution and including a counter electrode therein; and
  c. establishing a current or voltage between the electrocatalyst and the counter electrode such that the charge density (voltage or current) is focussed at the functional surfaces and the active species undergoes the redox reaction following contact with the functional surfaces,
  wherein the active species is carbon dioxide and the is carbon dioxide is reduced to methanol.

In another aspect, there is provided a method of catalysing a redox reaction of an active species in a conductive solution, the method comprising:
  exposing an electrocatalyst system to the active species; and
  applying a voltage to the electrocatalyst system;
  wherein:
    the voltage is sufficient to cause a multi-electron oxidation or multi-electron reduction of the active species;
    the electrocatalyst system comprises:
      a counter electrode; and
      an electrocatalyst array comprising:
        a support substrate;
        uniformly sized surface structures protruding from a surface of the support substrate; and
        the uniformly sized surface structures comprising edges and apices comprising a catalyst.

In some embodiments the edges and/or apices comprise less than about 50% of the surface area, less than about 40%, less than about 30%, less than about 20%, less than about 10%, less than about 1%, less than about 0.01%, less than about 0.001%, less than about 0.0001%, less than about 0.00001%, less than about 0.000001%. In some embodiments, the edges and/or apices comprise about 0.0000001% or about 0.000001% to about 50% surface area of the catalyst when viewed from above. In some embodiments, the edges apices comprise about 0.0001% to about 50% surface area of the catalyst when viewed from above. In some embodiments, the edges apices comprise about 0.1% to about 50% surface area of the catalyst when viewed from above. In any of the embodiments herein, the uniformly sized surface structures may also be of uniform geometry.

In relation to the surface structures, there may be a plurality of surface structures of substantially uniform size and/or geometry, and the plurality of surface structures may comprise a catalyst or catalytic material upon one or more edges and/or apices and/or tips and/or apexes of said structures.

In some embodiments, the multi-electron oxidation or multi-electron reduction of the active species comprises a 2-electron process, a 4-electron process, a 6-electron process, an 8-electron process, a 10-electron process, or a 12-electron process.

In some embodiments, the multi-electron oxidation or multi-electron reduction of the active species comprises a 2-electron process comprising hydrogen evolution from water or protons, hydrogen oxidation to water or protons, hydrogen oxidation to hydrogen peroxide, oxygen reduction to hydrogen peroxide, conversion of carbon dioxide to carbon monoxide or nitrogen ($N_2$) reduction to hydrazine or methane to methanol.

In some embodiments, the multi-electron oxidation or multi-electron reduction of the active species comprises a 2-electron process comprising conversion of carbon dioxide to carbon monoxide.

In some embodiments, the multi-electron oxidation or multi-electron reduction of the active species comprises a 4-electron process comprising oxygen evolution from water, oxygen reduction to water, carbon dioxide reduction a aldehyde, or carbon dioxide reduction to formic acid.

In some embodiments, the multi-electron oxidation or multi-electron reduction of the active species comprises a 4-electron process comprising carbon dioxide reduction a aldehyde, or carbon dioxide reduction to a carboxylic acid.

In some embodiments, the multi-electron oxidation or multi-electron reduction of the active species comprises a 6-electron process comprising carbon dioxide reduction to an alcohol, nitrogen ($N_2$) reduction to ammonia, or production of hydrogen and nitrogen from ammonia. In some embodiments, the alcohol is methanol.

In some embodiments, the multi-electron oxidation or multi-electron reduction of the active species comprises an (2n+6)-electron process comprising reduction of carbon dioxide to an alkane of formula $C_nH_{2n+2}$, where n is from 2 to 21.

In some embodiments, the multi-electron oxidation or multi-electron reduction of the active species comprises a 8-electron process comprising the nitrate anions to ammonia.

In some embodiments, the multi-electron oxidation or multi-electron reduction of the active species comprises a 10-electron process comprising the oxidation of ethane.

In some embodiments, the multi-electron oxidation or multi-electron reduction of the active species comprises a 11-electron process comprising the conversion of nitrate anions to nitrogen.

In some embodiments, the multi-electron oxidation or multi-electron reduction of the active species comprises a 12-electron process comprising the oxidation of propane.

In another aspect, a method of catalysing gas formation from an active species in a conductive solution is provided. Such methods include exposing an electrocatalyst system to the active species and applying a voltage to the electrocatalyst system. In the methods, the voltage is sufficient to cause a multi-electron oxidation or multi-electron reduction of the active species. Additionally, the electrocatalyst system comprises: a counter electrode; and an electrocatalyst array, where the electrocatalyst array includes a support substrate; uniformly sized surface structures protruding from a surface of the support substrate; wherein the uniformly sized surface structures have edges and/or apices comprising a catalyst; and a rate of gas formation is increased by at least a factor of 1.5 compared to the same electrocatalyst array without the uniformly sized surface structures protruding from a surface of the support substrate. In any of the embodiments herein, the uniformly sized surface structures may also be of uniform geometry.

In relation to the surface structures, there may be a plurality of surface structures of substantially uniform size and/or geometry, and the plurality of surface structures may comprise a catalyst or catalytic material upon one or more edges and/or apices and/or tips and/or apexes of said structures.

In another embodiment, the rate of gas formation is increased by up to a factor of 1000. In another embodiment the rate of gas formation is increased by between a factor of 1.5 and 1000, in another embodiment between a factor of 10 and 1000, in another embodiment between a factor of 20 and 500, in another embodiment between a factor of 50 and 500, in another embodiment between a factor of 50 and 300.

In another aspect, a method is provided which allows for the selection of an electrocatalyst array based upon a desired product outcome. The methods comprise exposing an electrocatalyst system to an active agent dissolved or suspended in a conductive solution; and applying a voltage to the electrocatalyst system. In the methods, the voltage is sufficient to cause a multi-electron oxidation or multi-electron reduction of the active species, and the electrocatalyst system includes a counter electrode; and an electrocatalyst array. The electrocatalyst array comprises a support substrate; and uniformly sized surface structures protruding from a surface of the support substrate, wherein the uniformly sized surface structures have edges and/or apices comprising a catalyst. Where the uniformly sized surface structures are of a micrometer scale a first product is produced, however, where the uniformly sized surface structures are of a nanometer scale a second product is produced, where the first and second products are different. Producing the second product requires a higher order electron process compared to producing the first product. In other words, producing the second product requires more elections than the first product. In any of the embodiments herein, the uniformly sized surface structures may also be of uniform geometry.

In relation to the surface structures, there may be a plurality of surface structures of substantially uniform size and/or geometry, and the plurality of surface structures may comprise a catalyst or catalytic material upon one or more edges and/or apices and/or tips and/or apexes of said structures.

In another aspect, a method is provided which allows for selection of an electrocatalyst array based upon a desired product outcome, the method comprises exposing an electrocatalyst system to an active agent dissolved or suspended in a conductive solution; and applying a voltage to the electrocatalyst system, wherein:
the voltage is sufficient to cause a multi-electron oxidation or multi-electron reduction of the active species;
the electrocatalyst system comprises:
a counter electrode; and
an electrocatalyst array comprising
a support substrate;
the uniformly sized surface structures protruding from a surface of the support substrate; and
the uniformly sized surface structures have edges and/or apices comprising a catalyst;
wherein the uniformly sized surface structures are of a micrometer scale a first product ratio is produced, wherein the uniformly sized surface structures are of a nanometer scale a second product ratio is produced, wherein the first and second product ratios are different;
the second product ratio requires a higher order electron process compared to producing the first product ratio.

In some embodiments the active species is oxygen, the first product may be hydrogen peroxide (a two-electron process) (i.e. a product ratio of hydrogen peroxide to water of 100 to 0) and the second product may be water (a four election process) (i.e. a product ratio of hydrogen peroxide to water of 0 to 100).

In some embodiments, the width of the surface structures on the nanometer scale where it joins the support substrate are about 25 nm to about 50000 nm.

In some embodiments, the width of the surface structures on the micrometer scale where it joins the support substrate are about 5 μm to about 500 μm.

In some embodiments, an inert or passivating layer may be deposited between the surface structures to facilitate tuning the product ratio.

In some embodiments, the inert or passivating or substantially less active layer may be deposited to be of a thickness to adjust a relative ratio of the product between the second product ratio and the first product ratio.

In some embodiments, the greater the thickness or an increased thickness of the inert or passivating layer, the closer the relative ratio becomes to the first product ratio.

In some embodiments, a relative ratio between the first product ratio and second product ratio may be adjusted according to a relative thickness or height of the inert or passivating layer (by adjusting an exposure of the surface structure, such as a smaller amount of the surface structure or a greater amount of the surface structure).

In relation to thickness of the inert or passivating layer, the thickness is made with reference to the height of the surface structure above the supporting surface.

The above adjustment of thickness of the inert or passivating layer can be applied to the fabrication of the functional surface or catalyst.

In some embodiments, the thickness of the inert or passivating layer may be about 5% and about 95% of the height of the surface structure.

In some embodiments the thickness of the inert or passivating layer may be at least 99% of the height of the surface structure.

In some embodiments, the thickness of the inert or passivating layer may be of a proportion of the height of the surface structure so as to expose a nanometer scale size of the apex or tip or apices of the surface structure.

For example, in some embodiments of the methods, where the active species is oxygen, the first product may be hydrogen peroxide (a two-electron process) and the second product may be water (a four election process).

In other embodiment of the methods, where the active species is $CO_2$, the first product may be CO, and the second product may be formic acid and the third product may be methanol. In other embodiment of the methods, where the active species is Nitrate, the first product may be ammonia, and the second product may be nitrogen. In other embodiment of the methods, where the active species is Nitrogen, the first product may be hydrazine, and the second product may be ammonia.

In another aspect, a method is provided for the selection of an electrocatalyst array based upon a desired product outcome. The methods include exposing an electrocatalyst system to an active agent dissolved or suspended in a conductive solution, applying a voltage to the electrocatalyst system, and collecting a redox product. In the methods, the voltage is sufficient to cause a multi-electron oxidation or multi-electron reduction of the active species. Also in the methods, the electrocatalyst system includes a counter electrode; and an electrocatalyst array, wherein the array includes a support substrate and uniformly sized surface structures protruding from a surface of the support substrate, and wherein the uniformly sized surface structures have edges and/or apices comprising a catalyst. Also in the methods, the dimensions of the uniformly sized surface structures are selected to change the redox product collected.

In some such embodiments, the active agent is oxygen, the uniformly sized surface structures are of a micrometer scale, and the redox product is hydrogen peroxide. In other such embodiments, the active agent is oxygen, the uniformly sized surface structures are of a nanometer scale, and the redox product is water.

In another aspect, a method of gas generation from an electrode is provided. The method includes exposing an electrode to a conductive solution comprising an active species; and applying a voltage to the electrode sufficient to reduce or oxidize the active species to generate the gas. In the method, the electrode comprises a nanostructured array, which in turn includes a support substrate; and pyramidal surface structures protruding from the support substrate. In the array, each of the pyramidal surface structures have a base, an apex, and edges between the base and the apex, the base being in contact with the support substrate, the base having a longest side dimension from 50 nm to about 4000 nm, the apex about 1 nm to about 50 nm, and a distance between adjacent apices of about 50 nm to 1000 nm; and, wherein the edges and apex comprise a catalyst.

In some embodiments, the method further includes an electrolytic system comprising the electrode and a counter electrode. In some embodiments, the apices are configured such that gas generation is initiated at the apex. In any such embodiments, the gas may be hydrogen, oxygen, or both hydrogen and oxygen. In any of the embodiments, the gas may be hydrogen, nitrogen, or both hydrogen and nitrogen. In any of the embodiments, the gas may be ammonia.

In some embodiments, the pyramidal surface structures in the nanostructured array are substantially the same is shape and height.

In another aspect, there is provided an electrocatalyst array comprising:
- a support substrate;
- uniformly sized surface structures protruding from a surface of the support substrate; and
- the uniformly arranged sized surface structures comprising edges and apices; and
- platinum and carbon deposited on at least a portion of the surface structures.

In another aspect, any one or more of the above aspects as described herein, or below embodiments as described herein, may facilitate the substitution of a catalyst to either a lower economic cost and/or activity, and/or reduced quantity.

Wherein the substituted catalyst is of a lower reactivity and/or quantity than the catalyst which it is substituting or to substitute.

For the avoidance of doubt the following embodiments refer to all the aspects described above.

In some embodiments, a cross-sectional area of the surface structure diminishes along an axis that is orthogonal to a top surface of the support substrate.

In some embodiments, the upper portion of the surface structure has a convex upper surface.

In some embodiments, the surface structure has a triangular, convex, semi-circular or papilliform cross-section along a plane orthogonal to a top surface of the support substrate.

In some embodiments, the upper portion of the surface structure has an angle of about 90° or less at the apex. In some embodiments, the surface structure is a sharp tip or ridge.

In some embodiments, the surface structures are pyramidal, conical, ridges, peaked, spiked, cylindrical, square pentahedron, flat top pentahedron, pentagonal, or hexagonal or combinations thereof. Any such structures may have edges, apices, ridges, or any combination of two or more such features.

In some embodiments, the surface structure has a substantially triangular, substantially circular or substantially square cross-section along a plane parallel to a top surface of the support substrate.

In some embodiments, the surface structures are uniformly arranged on the support substrate. Alternatively, the surface structures are randomly arranged on the support substrate.

In some embodiments, the surface structures are substantially uniformly sized. It is believed that a uniform size and/or geometry may provide substantially homogenous results, such as, but not limited to, substantially the same current and/or voltage at each structure producing substantially homogenous product. In an example embodiment the surface structures and catalyst may be tuned to provide for the production of substantially a predetermined primary or preferential product. Alternatively, the surface structures and catalyst may be tuned to provide for the production of one or more predetermined products, for example a preferential or primary product, and a secondary product (which may also be preferential). Similarly, the surface structures and catalyst may be tuned to minimise the production of non-preferential product.

In relation to the surface structures, there may be a plurality of surface structures of substantially uniform size and/or geometry, and the plurality of surface structures may comprise a catalyst or catalytic material upon one or more edges and/or apices and/or tips and/or apexes of said structures.

In some embodiments, the surface structures have at least one line of symmetry. In some embodiments, the surface structures have at least two lines of symmetry.

In some embodiments the surface structure(s) is/are of one or more of the following:
i. the same or different or dissimilar heights from the surface of the support substrate,
ii. the same or different or dissimilar geometry of shape with respect to other surface structure(s),
iii. of a regular or irregular geometry,
iv. are equally or unequally spaced from each other,
v. are of the same or different or dissimilar density,
vi. a grouping of a plurality of said surface structure(s) comprising a plurality of surface structure(s) of any one of i-v.

In some embodiments the surface structure(s) is/are provided to be of a predetermined spacing or density so as to provide for a quantity of apexes or tips to act as a functional surface or to have a functional surface formed thereon of a required size and density for a reduction or oxidation of the active species as described herein.

In some embodiments the surface structure(s) is/are provided to be of a predetermined uniform spacing or density so as to provide for a quantity of uniformly sized apexes and/or tips to act as a functional surface or to have a functional surface formed thereon of a required size and density for a reduction or oxidation of the active species as described herein. In any of the embodiments herein, the uniformly sized surface structures may also be of uniform geometry.

In relation to the surface structures, there may be a plurality of surface structures of substantially uniform size and/or geometry, and the plurality of surface structures may comprise a catalyst or catalytic material upon one or more edges and/or apices and/or tips and/or apexes of said structures.

In some embodiments the surface structure(s) comprises of a distal end portion, said distal end portion being spaced most from the surface from which said surface structure(s) extend, said distal end portion being of a sharp or peak or spike or apex or tip or ridge form to act as a functional surface or to have a functional surface formed thereon.

In some embodiments the surface structure(s) are provided as an array or plurality of arrays of surface structures, provided upon the support substrate surface.

In some embodiments the array or each array is a uniform pattern, arranged geometrically.

In some embodiments the array or each array is a serially sequenced pattern of a grouping of surface structure(s).

In some embodiments the array or each array is separately provided for by a forming tool of a continuous forming machine, hot embossing, lithography, injection moulding, stamping, electroforming, lithography, or other forming technology.

In some embodiments, the width of the surface structure where it joins the support substrate is between about 20 nm to about 5000 µm. In some embodiments, about 40 nm to about 4000 µm; about 55 nm to about 3000 µm; about 75 nm to about 2500 µm; about 100 nm to about 4000 µm; about 250 nm to about 3500 µm about 20 nm to about 3500 µm; about 2 nm to about 4000 µm; about 20 nm to about 2500 µm; about 20 nm to about 4000 µm; about 20 nm to about 3000 µm; about 20 nm to about 2000 µm. In some embodiments, about 5 nm to about 750 µm; about 5 nm to about 500 µm; about 5 nm to about 100 µm.

In some embodiments, the width of the surface structures on the micrometer scale where it joins the support substrate are about 5 μm to about 500 μm. In some embodiments, the width of the surface structure on the micrometer scale is about 50 μm.

In some embodiments, the length of the surface structures on the micrometer scale where it joins the support substrate are about 5 μm to about 500 μm. In some embodiments, the length of the surface structure on the micrometer scale is about 50 μm.

In some embodiments, the width of the surface structures on the nanometer scale where it joins the support substrate are about 25 nm to about 5000 nm. In some embodiments, the width of the surface structure on the micrometer scale is about 250 nm.

In some embodiments, the length of the surface structures on the nanometer scale where it joins the support substrate are about 25 nm to about 5000 nm. In some embodiments, the length of the surface structure on the micrometer scale is about 250 nm.

In some embodiments, the height of the surface structure (i.e. the height of protrusion out of the support substrate) is between about 20 nm to about 5000 μm. In some embodiments, about 40 nm to about 4000 μm; about 55 nm to about 3000 μm; about 75 nm to about 2500 μm; about 100 nm to about 4000 μm; about 250 nm to about 3500 μm about 20 nm to about 3500 μm; about 2 nm to about 4000 μm; about 20 nm to about 2500 μm; about 20 nm to about 4000 μm; about 20 nm to about 3000 μm; about 20 nm to about 2000 μm. In some embodiments, about 5 nm to about 750 μm; about 5 nm to about 500 μm; about 5 nm to about 100 μm.

In some embodiments, the height of the surface structure on the micrometer scale where it joins the support substrate are about 5 μm to about 500 μm. In some embodiments, the height of the surface structure on the micrometer scale is about 50 μm.

In some embodiments the surface structures on the micrometer scale are provided at a density so as to provide about 180,000 to about 1,800 apexes or tips per square centimeter to provide a functional surface or have a functional surface formed thereon. In some embodiments the surface structures on the micrometer scale are provided at a density so as to provide about 18,000 apexes or tips per square centimeter to provide a functional surface or have a functional surface formed thereon.

In some embodiments, the height of the surface structure on the nanometer scale where it joins the support substrate are about 25 nm to about 5000 nm. In some embodiments, the height of the surface structure on the nanometer scale is about 250 nm.

In some embodiments the surface structures on the nanometer scale are provided at a density so as to provide about 160,000,000 to about 16,000,000,000 apexes or tips per square centimeter to provide a functional surface or have a functional surface formed thereon. In some embodiments the surface structures on the nanometer scale are provided at a density so as to provide about 1,600,000,000 apexes or tips per square centimeter to provide a functional surface or have a functional surface formed thereon.

In some embodiments, the functional surface is at or about an apex of the surface structure.

In some embodiments, the functional surface is at or about an apex of the surface structure and the surface structure is tapered to an apex and/or has a substantially triangular cross-section along a plane parallel to a top surface of the support substrate.

In some embodiments, the functional surface is at or about an apex of the surface structure and wherein the width of the apex of each surface structure is between about 1 nm to about 5000 μm. In some embodiments, between about 10 nm to about 10 μm, or about 20 nm to about 2 μm, or about 30 nm to about 1 μm. In some embodiments, about 1 nm to about 1000 nm, or about 1 nm to about 500 nm, or about 1 nm to about 100 nm, or about 1 nm to about 50 nm. The width of the apex of each surface structure being less than where it joins the support substrate.

In some embodiments, the functional surface is at or about an apex of the surface structure and wherein the apexes of the surface structures are separated from each other by about 5 nm to about 1000 μm; about 10 nm to about 1000 μm; about 25 nm to about 1000 μm; about 5 nm to about 750 μm; about 5 nm to about 500 μm; about 5 nm to about 100 μm, apex to apex. In some embodiments, about 5 nm to about 2000 nm; about 5 nm to about 1000 nm; about 5 nm to about 500 nm, apex to apex.

In some embodiments, the support substrate comprises a metal, composite material, polymer, silicon or glass.

In some embodiments, the support substrate comprises a single layer or multiple layers. In some embodiments, the support substrate is non-conductive, for example a non-conductive polymer, glass and/or silica. In some embodiments, the support substrate is conductive. In some embodiments, the conductive material is a doped Si, semiconductor, metal, conductive polymer, carbon loaded polymer or composite material. In some embodiments, the metal is a transition metal including Ni, Cu, Al, Pt, Au, Ag, Mg, and Mn.

In some embodiments, the surface structures are integral with the support substrate. In some embodiments, the surface structures are integrally formed with the support substrate. In some embodiments, the surface structures are the same material as the support substrate. In some embodiments, the surface structures and the support substrate comprise a metal. In some embodiments, the support substrate and the surface structures comprise a composite material, polymer, silica or glass.

In some embodiments, the support substrate and the surface structures comprise a first material, and the uniformly sized surface structures further comprise a layer coated thereon.

In some embodiments, the support substrate has a thickness of between about 50 μm to 5mm. In some embodiments, the support substrate has a thickness between about 1 mm and 2 mm; about 85 μm and about 2 mm; about 85 μm and about 1 mm; about 1mm and about 4 mm; about 1mm and about 3 mm; about 85 μm and about 2 mm.

In some embodiments, the electrocatalyst is deposited on an upper surface of the support substrate. In some embodiments, the electrocatalyst is deposited on an upper surface of the surface structures. In some embodiments, the electrocatalyst is deposited at the tips of the surface structure. In some embodiments, the electrocatalyst is a different material to the surface structure and/or the support substrate.

In some embodiments, the electrocatalyst is deposited on less than about 50% to about 0.000001% of the surface when viewed from above. In some embodiments the electrocatalyst is deposited on less than about 50% of the surface area, less than about 40%, less than about 30%, less than about 20%, less than about 10%, less than about 1%, less than about 0.01%, less than about 0.001%, less than about 0.0001%, less than about 0.00001%, less than about 0.000001%. In some embodiments, the electrocatalyst is deposited on about 0.0000001% or about 0.000001% to about 50% surface area of the catalyst when viewed from above. It will be apparent the lowest possible surface area is a single atom on a support structure.

In some embodiments, the electrocatalyst is deposited on less than about 50% to about 0.0001% of the surface when viewed from above. In some embodiments, the electrocatalyst is deposited on less than about 50% to about 0.1% of the surface when viewed from above. In some embodiments, the electrocatalyst is deposited on less than about 30% to about 0.0001% of the surface of the array when viewed from above.

In some embodiments, the electrocatalyst comprises a layer of substantially constant thickness. In some embodiments, the thickness of the electrocatalyst is between about 1 nm and 5 μm. In some embodiments, between about 20 nm and 500 nm or between about 50 nm and 100 nm; about 50 nm and 500 nm; about 50 nm and 300 nm; about 1 nm and about 3 μm; about 3 nm and about 5 μm; about 2 nm and about 4 μm. In some embodiments, the thickness of the electrocatalyst is greater than 0 nm but less than about 1 nm.

In some embodiments, the electrocatalyst on the upper surface of two or more surface structures are electrically connected within the array.

Alternatively, the electrocatalyst is integral to the surface structure(s). In some embodiments, the electrocatalyst is integrally formed with the support structure. In some embodiments, the electrocatalyst is the same material as the surface structure(s).

In some embodiments, the electrocatalyst comprises a material that produces a catalytic effect. In some embodiments, the electrocatalyst comprises a conductive material. Conductive materials may include, but are not limited to, carbon (i.e. graphite, graphene, carbon fibers, carbon nano-tubes, fullerenes), conducting polymers (i.e. polypyrrolidone (PPy), polyacetylene, a metal, an alloy, an organometallic complex, or other such conductive material. In some embodiments, the electrocatalyst comprises copper, a transition metal, an alloy, an organometallic complex, an organometallic complex including transition metal, an organic material that is able to be oxidised or reduced. In some embodiments, the transition metal is selected from Ti, V, Cr, Fe, Co, Cu, Zn, Ga, Rb, Sr, Y, Zr, Nb, Mo, Tc, Ru, Ro, Pd, Ag, Cd, In, Sb, Sn, Cs, Ba, La, Ce, PR, Nd, W, Os, Ir, Au, Pb, Bi, Ra, U, Pt, Au and Ni. In some embodiments, the electrocatalyst comprises nickel. In some embodiments, the organometallic complex and/or organometallic complex including transition metal is selected from Ferrocene, Porphyrin, Phenanthroline, Porphyrin Imidazole, tris pyridyl amine, and/or triazole, with a transition metal (Ferrocene already including a transition metal and Porphyrin may optionally include a transition metal).

In some embodiments, the conductive solution comprises water and/or an organic solvent. In some embodiments, the organic solvent is selected from an alcohol (for example ethanol), an ether, acetonitrile, ethyl acetate, acetone and/or DMSO.

In some embodiments, the conductive solution comprises an electrolyte. In some embodiments, the electrolyte is selected from a buffer(s), a salt (for example NaCl), or acid and base solutions (for example $H_2SO_4$, $HNO_3$, NaOH)). In some embodiments, the solution comprises a buffer solution with alkali metal chloride ions and copper 2+ ions.

In some embodiments, the active species is in a gas or a liquid state. In some embodiments, the active species is a gas that is passed through the conductive solution. In some embodiments, the gas is selected from hydrogen, oxygen, nitrogen, methane, carbon monoxide and/or carbon dioxide or air, or a mixture of any two or more of thereof. In some embodiments, the active species is a liquid. In some embodiments, the liquid is water, methanol, ethanol, propanol, acetone, ammonia, liquid short chain hydrocarbons (for example up to C21). Where the active species is water, the conductive solution is preferably also water with an electrolyte or an organic solvent. The organic solvent may be added to aid solubility or participate in the oxidative or reductive processes.

The counter electrode performs the charge balancing redox (either oxidation or reduction, anode or cathode) processes and compliments the redox (either oxidation or reduction, anode or cathode) processes occurring at the working electrode.

In some embodiments, Preferably counter electrode, which performs the charge balancing redox (either oxidation or reduction) processes and compliments the redox (either oxidation or reduction) processes occurring at the working electrode, is formed of a material selected from the group consisting of an inert conductive material, a conductive material, a metal, Pt, Gold, carbon, graphite, graphene, carbon fibre, carbon nano-tubes, a fullerene, conducting polymer PPy, PA, PAcetylene or the same material as the working electrode. The counter electrode may be of various forms, shapes and sizes including: cloth, flat, perforated sheet, fibres, mesh, or a 3D array as defined within this document. It is expected that 3D structures will enhance the redox properties including catalysis of the counter electrode in similar fashion to that occurring on the working electrode as described in this document.

In some embodiments, the counter electrode structure is flat or an array structure. For example, an array of pyramids, an array of cones, pyramidal, conical, or ridged. In some embodiments, the counter electrode comprises surface structures, such as described herein. In some embodiments, the shape of the counter electrode reflects that of the surface structures. In some embodiments, the counter electrode comprises surface structures in a reciprocal fashion to the electrocatalyst array. In some embodiments, the counter electrode comprises surface structures which are dissimilar in size or geometry or pattern to the electrocatalyst array.

In some embodiments, the counter electrode is (a) in a fixed orientation with respect to the surface structure, or (b) attached to the electrode array, or (c) held in an orientation to minimise differential in distance between the surface structure(s) of the array, or (d) above an upper surface of the array, or (e) includes 3D surface features which are configured in such a way as to promote the location of the charge density (voltage or current) on the 3D working electrode, such as a series of tips that reflects the tips of the working electrode.

In some embodiments, the counter electrode is parallel to the surface structures.

The reaction at the counter electrode could be any redox process. For example, oxidation of an alcohol, water, or other component to complement a reduction at the surface structure, or vice versa.

In some embodiments, counter electrode is formed of a material selected from the group consisting of an inert conductive material, a conductive material, a metal, Pt, Au, carbon, graphite, graphene, carbon fibre, carbon nano-tubes, a fullerene, conducting polymer PPy, PA, PAcetylene or the same material as the electrocatalyst array. In some embodiments the counter electrode is cloth, flat, perforated sheet, fibres, mesh, or a 3D array as defined within this document. It is expected that 3D structures will enhance the redox properties including catalysis of the counter electrode in similar fashion to that occurring on the working electrode as described in this document.

In some embodiments, the potential difference established between the counter electrode and the electrocatalyst is between about −2V and +2V. In some embodiments between about −1V and +1V. In some embodiments, the potential difference is between about −200 mV and −1V. Preferably the potential difference is between about 0 mV and 1.8V. for oxidation.

In some embodiments, the current established between the electrocatalyst and the counter electrode is substantially constant.

In some embodiments, the current established between the electrocatalyst and the counter electrode is pulsed between an activating potential and an inactivating potential. In some embodiments, the current established between the electrocatalyst and the counter electrode is pulsed between an activating potential and an inactivating potential in the range.

In one embodiment, the solution further comprises a reference electrode.

In some embodiments, the electrocatalyst array comprises a binding layer wherein the binding layer is either present on the functional surface at a significantly increased density than at a non-functional surface on the electrocatalyst array; or present on a non-functional surface of the electrocatalyst array at a significantly increased density than at a position on the functional surface on the surface structure.

In some embodiments, the binding layer comprises a self-assembled monolayer (SAM). In some embodiments, the SAM is present on an upper surface of the electrocatalyst. In some embodiments, the SAM is present on an upper surface of the support substrate. In some embodiments, the SAM is present around the surface structures such that the surface structure or a portion thereof protrudes with an exposed functional surface thereon.

In some embodiments, the SAM comprises long-chain molecules comprising a carbon chain of C6 to C24 which may be alkane, alkene, alkyne or aromatic. In some embodiments, C6, C7, C8, C9, 010, 011, C12, C13, C14, C15, C16, C17, C18, C19, C20, C21, C22, C23, or C24 or mixtures of these.

In some embodiments, the SAM comprises short-chain molecules comprising a carbon chain of C10 or less. In some embodiments, C1, 2, 3, 4, 5, 6, 7, 8, 9, or 10 or mixtures of these.

In some embodiments, the SAM is a mixed SAM comprising long (C10-C24 as above) and short chain (C1-C10 as above) molecules, which may be alkane, alkene, alkyne or aromatic. In some embodiments, the mixed SAM comprises long-chain molecules comprising a carbon chain of C6 to C24 (as above) and short-chain molecules of C1 to C5 (as above).

In some embodiments, the long-chain SAM comprises molecules selected from the group consisting of azides, amines, carboxylates, aldehydes, ketones, esters or carboxylic acids or mixtures thereof. Such molecules being present within the backbone of the SAM. In some embodiments, the short-chain SAM comprises molecules selected from the group consisting of alkanes, azides, amines, hydroxyls, carboxylates or carboxylic acids or mixtures thereof. Such molecules being present within the backbone of the SAM.

In one embodiment, the SAM comprises a mixture of long chain molecules comprising carboxylic acid molecules of greater than C6 and short chain molecules comprising hydroxyl molecules. In the above embodiments, the SAM long chain molecules are preferably selected from C6 to C24 molecules.

In some embodiments, the SAM is present on the electrocatalyst array but is absent at the upper portion of the surface structure (including the functional surface) as defined above.

In some embodiments, the SAM comprises short-chain molecules comprising a carbon chain of C5 or less and wherein the upper portion of the surface structure(s) is either (a) free of SAM, or (b) wherein the SAM is adapted to be removed by establishing a current between the electrocatalyst layer and the counter electrode.

In some embodiments, the SAM comprises a long chain SAM having a carbon chain of C6 to C24, and wherein the upper portion of the surface structure(s) is either (a) free of SAM, or (b) comprises a SAM adapted to be removed by establishing a current between the electrocatalyst layer and the counter electrode.

In one embodiment, the electrode array comprises a SAM binding layer on an upper and lower portion of the surface structure and contact of the active species with the functional surface results in selective removal of the SAM binding layer from the upper portion of the surface structure where charge density (voltage or current) is focussed. In this embodiment, the method further comprises the step of selective deposition of a further binding layer on the now exposed portion of the electrocatalyst layer at the functional surface.

In some embodiments, the SAM is selected from the group consisting of an alkane thiol with a terminal methyl, azide, thiol, aldehyde, cyano, diazonium, amines, alcohols, silanes, phosphonic acids and carboxylic acids.

In particular embodiments, the SAM comprises:
R-(aromatic)$_n$-SH, alkane, alkene, alkyne or aromatic, including both straight chain and chains comprising of amide and ester linkages
R—(CH$_2$)$_n$—SH, R—(CH$_2$)$_n$—NH$_2$, or
R—(CH$_2$)$_n$—Si(OR')$_3$
wherein R=alkyl, carboxylic acid, amine, aldehyde, alcohol, azide, quinone or tetrazine; and
R'=Me, MeOH, Cl, (Halide), Et, EtOH; and
wherein n=1 to 50.

In some embodiments, the conductive solution comprises a solute reactant capable of attachment to the binding layer. In some embodiments, the SAM comprises a functional group which reacts with the solute reactant. In some embodiments, the functional group is a terminal functional group. In some embodiments, the SAM is functionalised with a functional group. In some embodiments, the functional group is selected from the group consisting of azide, carboxylic acid, amine, alcohol, ester, ketone, cyano and aldehyde.

In some embodiments, the electrode array provided in step a) of the first aspects comprises a passivating layer deposited on the support substrate and covering the lower portion of the surface structure and having the top portion exposed.

In some embodiments, the step of applying a current or a voltage to focus charge density (voltage or current) results in removal of the passivating layer on the functional surface on the upper portion of the surface structures.

In some embodiments, the passivating layer is removed by applying a reductive or oxidative potential between the counter electrode and the electrode surface. In some embodiments, the potential is between, −2V and +2V. and in some embodiments, −200 mV and −1V, and in some embodiments, −400 mV relative to a silver/silver chloride reference electrode.

In some embodiments, the passivating layer comprises a functional group to attach to the electrode surface. In one embodiment, the passivating layer comprises a binding layer as described and defined herein. In one embodiment, the passivating layer comprises a SAM. In some embodiments, the SAM is attached to the electrode surface by a sulphur atom. In some embodiments, the electrode surface is gold. In some embodiments, the SAM further comprises a functional group, for example an alkyl chain, and in some embodiments, further comprises a carboxylic acid coupled to an amine on the functional group.

The passivating layer in between the tips could be a photoresist that is deposited on by spin coating, painting, spray coating. Once this layer is dry or cross-linked it becomes the passivation layer and aids in focusing the current. Ideally this layer is a lacquer or UV cross-linked photoresist such as SU8. In some embodiments, the passivating layer, or protection layer, may include a catalytic material that is in a non-active location on the surface, for example, at locations other than edges, ridges, and/or apices, or immediately adjacent to such areas.

In some embodiments, the binding layer is present on at least one of: the functional surface; the surface structures; the passivating layer; or the support substrate.

In some embodiments, the method is carried out in a fuel cell.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be in any sense limiting.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

Embodiments of the invention will now be described, by way of example only, with reference to the accompanying drawings in which:

FIG. 7b shows the corresponding Tafel plots for the CVs from FIG. 7a.

DETAILED DESCRIPTION OF PREFERRED EMBODIMENTS

Definitions

Figure 1:
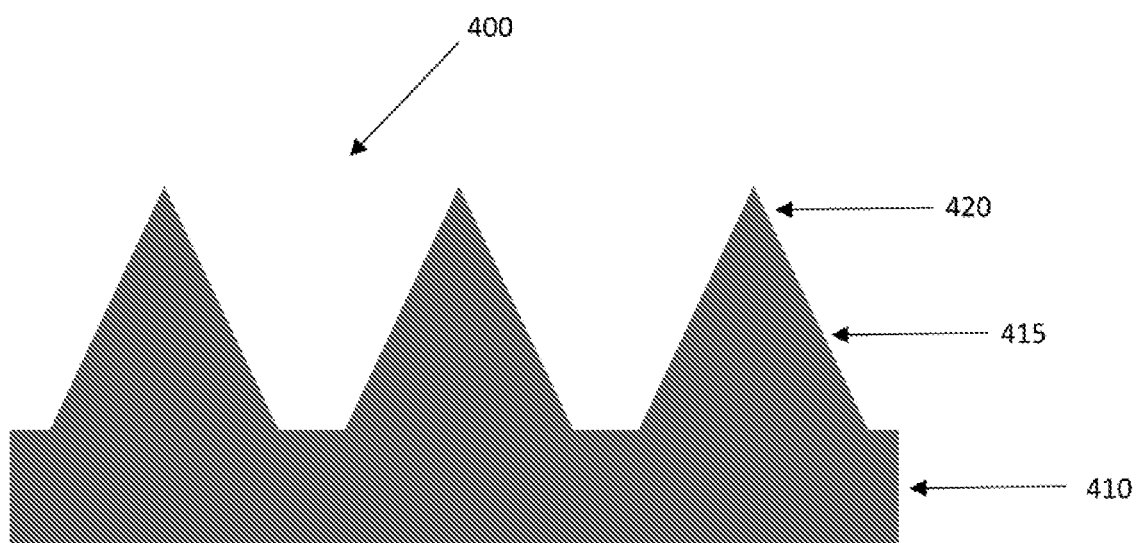
FIG. 1 shows a cross-sectional view of an electrode array according to the invention with a triangular cross-section.

"Attach" or "bind" means covalent bonding, electrostatic bonding or some other bonding mode where the species is bound in some way to the support. Attachment may be direct or via another species.

"Tapered" means moving from a wider surface structure to a narrower surface structure.

"Deposited" means formed on a surface and may refer to any form of formation, layering or production. In one embodiment, the deposition is achieved by sputtering, e-beam or thermal evaporation. Preferably the deposited layer has some degree of adherence to the layer on which it is deposited. This adherence may be covalent, electrostatic or include Van der Waals forces.

"Substantially constant thickness" in relation to the electrocatalyst means that the electrocatalyst does not vary significantly over the extent of its coverage of the support substrate or binding layer. Unintentional variations in the thickness of the layer that have substantially no effect on function of the sensor are intended to be incorporated by the term substantially constant thickness.

"Comprise", "comprising", and the like, are, unless the context clearly requires otherwise, to be construed in an inclusive sense as opposed to an exclusive or exhaustive sense, that is to say, in the sense of "including, but not limited to".

The terms "Surface structure" and "functional surface" as referred to herein are intended to refer to singular or plural structure/surfaces.

"Width" of a surface structure is measured by the greatest distance across a cross-sectional area of the surface structure where the cross-section is taken along a plane substantially parallel to an upper surface of the support substrate. Where width is referred to, the point on the surface structure at which the parallel plane occurs is also described (e.g. at the joint between the support substrate and the surface structure).

"Catalyst" refers to the species that increases the rate of a chemical reaction.

"Electrochemically modified" in relation to an active species means that the active species undergoes reduction or oxidation i.e. gain or loss of electrons.

"Solute reactant" means a reactant found in the solution which takes part in a reaction catalysed by a catalyst active species. The solute reactant will preferably be in another conductive solution (i.e. different to the conductive solution comprising the active species) or may be in the same solution and when reacted with the active species serve to bind/react with a target molecule to be detected by the sensor.

"Binding layer" comprises a layer of molecules attached to a surface of the electrode array. The binding layer may be formed from a cross-linked polymer, a photo-resist or a self-assembled mono-layer (SAM). Preferably the cross-linked polymer is an epoxy-based negative photoresist such as SU-8. The binding layer may be deposited onto the surface of the electrode array by means known to those of skill in the art, for example by spin-coating, spray-coating, dip-coating, wiping or painting. In alternative embodiments, the binding layer is attached to a surface of the electrode array by electrochemical modification of a precursor to a binding layer (i.e. an active species), preferably according to the methods described herein.

"Focussed" in relation to an electrical current or voltage means that the charge density (voltage or current) is stronger in a focused position on a surface compared to another position on a surface. Charge density (voltage or current) on a surface can be measured according to methods known to those of skill in the art. However, in one embodiment, the charge density (voltage or current) is measured by modelling, and then directed attachment of a fluorophore, or platinum deposition on the surface.

"Counter electrode" the counter electrode may be any conductive entity that facilitates a current flow from the electrode layer through the solution. In one embodiment, the counter electrode comprises a wire or other form of electrode structure held within the solution. Preferably the counter electrode is formed from a material selected from the group consisting of a metal, Pt, Gold, nickel, copper, iron, carbon, graphite, graphene, carbon fibre, carbon nanotubes, a fullerene, conducting polymer PPy, PA, Polycetylene, stainless steel. The counter electrode may be made of a solid layer or the conducting layer deposited onto a suitable support e.g. polymer glass, metal. The counter electrode may also be a bare metal (Au, Pt, Stainless steel, copper) or an Au or Pt plated substrate (metal, polymer or glass), and may have 3D surface features which are configured in such a way as to promote the location of the charge density (voltage or current) on the 3D working electrode. For example, it may be a series of tips that reflects the tips of the working electrode.

"Activating" or "activate" means to convert an active species from an inactive form to a reactive form. Thus, "electrochemical activation" means to convert the active species into a reactive form by oxidising or reducing it by applying a current at an electrode.

"Activating potential" means the voltage (oxidative or reductive in the typical range between +2V and −2V) required to initiate a coupling/attachment/modification reaction. Typically, a reductive activating potential for click is from −500 mV to −100 mV.

"Inactivating potential" means the voltage required to stop a coupling/attachment/modification reaction "Active species" means an entity present in the solution which has the potential to undergo electrochemical modification. In one embodiment, the active species is a catalyst or a catalyst precursor. In another embodiment, the active species is a component of a binding layer. In another embodiment, the active species is a charged particle capable of attachment to a functional surface. In another embodiment, the active species is a binding agent capable of detecting a target analyte in the solution.

"Oxidation" means a chemical reaction involving the loss of electrons. Therefore, "oxidative" means facilitating the loss of electrons in a chemical reaction.

"Reduction" means a chemical reaction involving the gaining of electrons. Therefore, "reductive" means facilitating the gaining of electrons in a chemical reaction.

"Pulsed" or "pulsing" means to modulate a voltage or current from an activating potential to an inactivating potential. Pulsing may be regular or intermittent.

"Self-assembled monolayer (SAM)" means molecular assemblies comprising head groups linked to a tail group which terminates with a functional group.

"Selective removal" in reference to removal of an entity from a functional surface means that the removal is enhanced when compared to another surface on the array at which current is not focussed. For example, the removal of a SAM will occur at a faster rate, or a greater concentration of the entity will be removed when compared to those other surfaces. This wording does not imply that removal is complete or that removal does not occur to a lesser degree on other surfaces.

"Selective deposition" in reference to deposition of an entity on a functional surface means that deposition is enhanced when compared to another surface on the array at which current is not focused. For example, the deposition of a SAM will occur at a faster rate, or a greater concentration or density of the entity will be deposited compared to those other surfaces. This wording does not preclude the possibility that deposition occurs to a lesser degree on other surfaces.

"and/or" means "and" or "or", or both.

"(s)" following a noun means the plural and/or singular forms of the noun.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

Description

The inventors have found that the method that the method of the invention allows for reduction of costs associated with normally expensive catalytic materials. The reduction in costs is achieved by any one or more of the following:
1. enhancing the activity of the catalytic material,
2. lowering the amount of catalytic material required,
3. ability to substitute to a lower activity catalyst which is lower in cost without loss of effectiveness.
4. Lowering the energy required for the reaction to occur
5. Increasing the exchange current density
6. Enhancing the mass transfer rate between the reactant and the catalyst
7. Enhancing the mass transfer rate of the product/s from the catalyst The inventors have found that by modifying the surface of an electrode to form an electrocatalyst with an array of surface structures, when current or voltage is passed through the electrocatalyst exposed to a conductive solution, charge density (voltage or current) can be focussed towards the top (or tip) of surface structures. This can result in dramatic improvement in the reactions being electrocatalysed. Not only have the inventors observed kinetic enhancement, i.e. a dramatic increase in the rate of catalysis and thermodynamic enhancement, (for example the production of hydrogen from water which is increased by over 100 times), i.e. a dramatic decrease in the energy required to drive a redox catalytic reaction over a similar flat electrocatalyst, but unexpectedly the inventors have also observed change in reaction mechanism. For example, it is typical for electrochemical oxygen reduction in an aqueous alkali medium to generate pure peroxide ($H_2O_2$). However, using the method of the invention, surprisingly, water was produced. The possible reduction pathways are:

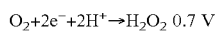
$O_2 + 2e^- + 2H^+ \rightarrow H_2O_2$ 0.7 V

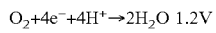
$O_2 + 4e^- + 4H^+ \rightarrow 2H_2O$ 1.2V

The method of the invention surprisingly facilitates the more efficient 4 electron process (see Example 3). This can result in lower energy losses and/or overcoming issues with $O_2$ reduction as the rate determining step. This can be particularly advantageous when used in a fuel cell, for example, as this can provide enhanced cell performance.

This 4-electron pathway appeared to be almost exclusively seen when using nano-surface structures, but was also seen particularly when using micro-surface structures.

Further redox reactions the method may be applied to include, but are not limited to:
hydrogen evolution from water;
oxygen evolution from water;
hydrogen oxidation;
carbon dioxide to carbon monoxide;
carbon dioxide to methanol;
carbon dioxide to carboxylic acid (for example, formic acid);
carbon dioxide to aldehyde and/or ketone;
carbon dioxide to methane, ethane, propane and/or higher order carbon chains up to $C_{21}$;
methane oxidation to methanol;
nitrogen to ammonia;
ammonia split to hydrogen and nitrogen.

Applications for the method of the invention include (but are not limited to) electrodes, batteries, fuel cells and/or hydrogen production.

Standard electrodes include a conductive solid support with the catalyst immobilised on the surface, examples of the conductive solid support include, but are not limited to:
metal coated polymer, glass or silicon
carbon mesh
Carbonaceous material (fibres, Vulcan, powder, glassy, edge plane, basal plane, fullerenes, nano tubes, graphene)
Metal sheet, perforated and un perforated
ITO or FTO coated sheet (polymer, glass, silicon)
Conducting polymer The inventors consider the catalysis relies on a combination of factors:
1. Diffusion of reactants and product both to and from the site of catalysis
2. The supply of electrons:
   a. An oxidative process requiring the supply of electrons to the site of catalysis
   b. A reductive process requiring the removal of electrons from the site of catalysis
3. The voltage at the site of catalysis being of sufficient magnitude to carry out the catalytic process
4. Facile electron transfer between the reactant and the catalyst,
5. Lowering the activation energy for the conversion
6. The catalyst material being used.

Three dimensionality provides the platform to achieve the above in a controllable fashion, and enhances the performance of existing catalysts which are either deposited directly onto the apices of the 3D structures or suspended in a matrix surrounding to the tips. This allows access to multi-electron transfer conversions (oxidative or reductive) that were not previously accessible, and controllably producing a greater range of products from a single starting material using the same catalyst.

As will be apparent to the skilled reader, where the description of the invention refers to a solution comprising both an active species and a counter electrode, this refers to the solution having the counter electrode position therein.

While not wishing to be bound by theory, the inventors believe the observed increases in the kinetic and thermodynamic rates, the dramatic increases in the reactivity of the electrocatalyst at the tops of tips, and/or the alternative reaction pathway, maybe be due to one or more of the following mechanisms:
1. The combination of high density voltage and current distribution result in less wasted voltage (i.e. voltage at the apex is effectively higher therefore resistance is lower) and producing more reactive electrons.
2. Hot electrons are produced via a plasmonic effect, which leads to more facile electron injection.
3. Combined effect of higher voltage, higher current density, lower resistance and more rapid diffusion of catalytic species producing a super charge state of catalytic species
4. The above in combination with an electromagnetic effect influencing constants such as potential field, concentration gradients, temperature, and pH.
5. A quantum effect increasing as smaller effective tip sizes or particle sizes are attained within a hot electron environment and caused by the tip environment. Resulting in increased current density of hot electrons to drive the reaction. This quantum effect increasing as the dimensions of the tips reduces in size.

6. Rapid diffusion in combination with the above environment and the small surface effective area changing the binding modes of the substrate, and leading to enhanced reactivity.
7. Reduced IR Drop due to a combination of the above reducing the "wasted energy" and therefore the energy cost for the reaction.
8. Reduced solution resistance due to the environment caused by the combination of effects as described the above.
9. Quantum effect which results in improving the binding orientation of the of substrate
10. Quantum effect due to changed binding modes of substrates a higher concentration of substrate (e.g. $H^+$) in smaller surface area due to differential current and potential density.
11. Reducing the activation energy of the catalytic process
12. Changing the density of state of the catalyst
13. Altering the Gibbs free energy of the equilibrium process
14. Increasing the enthalpy of the reaction and thereby making the reaction easier to perform
    a. Entropic effect
    b. More ordered
15. High current density and/or higher temperature at tip.

As will be apparent, the surface structures protruding from the support substrate create a 3-dimensional (3D) structure on the array.

In one embodiment, the surface structure(s) are integral with the support substrate. This means the surface structure(s) are formed from the same material as the support substrate and protrude from it. In this embodiment, the upper surface of the support substrate may comprise an array of surface structures arranged in an ordered or random configuration. In this embodiment, the electrocatalyst; may be formed/deposited on the upper surface of the surface structures (and support substrate where it is exposed) or the electrocatalyst can be also be the same material as the surface structures and/or the support substrate. The support substrate with integrated surface structure(s) may be formed by known methods, for example hot embossing, CFT processing, injection moulding, stamping, electroforming, lithography, and other similar techniques.

In an alternative embodiment, the surface structures are formed from a different material than the support substrate and are deposited on or attached to the support substrate. In this embodiment, the surface structures may be integral to the electrocatalyst. This means that the surface structures are part of the electrocatalyst and are formed from the same material as the electrocatalyst.

Alternatively, an electrocatalyst may be deposited or otherwise formed on the surface structures, and said surface structures are deposited on, integral with or otherwise formed on the support substrate. The support substrate with surface structure(s) formed from different materials may be formed by known methods, for example hot embossing, CFT processing, lasering of a photoresist, stamping or lithographic techniques, as well as deposition techniques such as growing of carbonaceous materials or vapour deposition.

It is particularly preferred that the electrocatalyst may be deposited or otherwise formed on the surface structures. The inventors have found this is cost effective as it requires less catalyst to be used. Catalysts are often expensive materials, for example platinum and/or gold. The ability to use small amounts of catalyst is very beneficial. The inventors have found using small amounts of catalyst still results in the same performance or even better performance than a flat electrode that uses far more catalyst.

The invention also or alternatively allows for substitution of an active, but usually more expensive catalyst, to be substituted for a less expensive catalyst which under standard conditions is less active. For example, where cost is a consideration, the catalyst may be copper, titanium, or nickel, instead of platinum, palladium, rhodium, iridium, or gold. It is believed that with the enhanced efficiency of electron transfer from the surface structures to the active agents, a lower cost catalyst such as nickel may be used to replace a more expensive catalyst such as platinum. Additionally, the amount of catalyst being focussed at the tips, apices, ridges, and/or edges of the surface structures, extraneous catalyst that may otherwise be located over other structural features or in valleys between the structures may be minimized, again resulting in a cost savings even where more expensive catalyst materials are used. The costs and activity of a range of catalysts are shown in Table 1.

TABLE 1

Exchange current densities of hydrogen evolution/anodic oxidation reaction of different catalytic materials in 1 mol/kg $H_2SO_4$

| Catalytic material | Exchange current density (A/cm$^2$) | Current price against USD (28 Feb. 2019) |
| --- | --- | --- |
| Palladium | $1.0 \times 10^{-3}$ | $1,533/oz |
| Platinum | $8.0 \times 10^{-4}$ | $870/oz |
| Rhodium | $2.5 \times 10^{-4}$ | $2,705/oz |
| Iridium | $2.0 \times 10^{-4}$ | $1,485/oz |
| Nickel | $7.0 \times 10^{-6}$ | $0.36/oz |
| Gold | $4.0 \times 10^{-6}$ | $1,320/oz |
| Titanium | $7.0 \times 10^{-8}$ | $1.61/lb |

In some embodiments, the cross-sectional area of the surface structure diminishes along an axis that is orthogonal to a top surface of the support substrate. In some embodiments, the upper portion of the at least one surface structure has a convex upper surface. In a more preferred form the surface structure has a triangular, convex, semi-circular or papilliform cross-section along a plane orthogonal to a top surface of the support substrate.

The upper portion of the surface structure preferably has an angle of about 90° or less at the apex, for example, the surface structure goes to a point. It is believed the sharper the angle, i.e. the sharper the point, the greater the effect on the electrocatalyst. In some embodiments, the surface structures are pyramidal, conical, ridges, or combinations thereof. In some embodiments, the surface structure has a substantially triangular, substantially circular or substantially square cross-section along a plane parallel to a top surface of the support substrate.

In a preferred embodiment the surface structures are uniformly arranged on the support substrate. although this could vary if desired. Uniformity is preferred as this results in more predictable behaviours and results. Also the amount of catalyst is limited to a confined region on the tops of the tips. This results in the activity of the catalyst being consistent and a higher purity product.

In some embodiments, the catalyst may be controllably deposited on the functional surface (such as edges, apexes, tips, apices, and/or other surfaces of the surface structures), by way of exposing the functional surface to: one or more of, but not limited to, electroplating, electroforming, electrodeposition, sputtering, e-beam, vapour deposition, thermal evaporation, plasma deposition.

In some embodiments, controlled deposition may be carried out by varying of one or more of, but not limited to, the following deposition parameters: voltage, current, time (residence time of the functional surface being exposed to the deposition technique, for example time submerged within an electroplating solution), pulse rate (such as electrodeposition pulse rate), and passivation layer (such as the use of a passivation layer to expose a partial surface of the surface structure, which may for example alter a current density of electrodeposition). It will be understood that any fabrication techniques described herein may be used to control deposition of catalyst, for example lithographic masking, SAM.

The surface structures are preferably substantially uniformly sized. As shown by the inventors, the size of the surface structures affects the activity of the catalyst and the redox reaction product. Uniformity in the size of the surface structures is preferred as it results in a more predictable and reproducible product. The size of the surface structures can be selected based on the desired product or product ratio. The product produced may also be substantially homogenous.

In an example embodiment the surface structures and catalyst may be tuned to provide for the production of substantially a predetermined primary or preferential product. Alternatively, the surface structures and catalyst may be tuned to provide for the production of one or more predetermined products, for example a preferential or primary product, and a secondary product (which may also be preferential). Similarly, the surface structures and catalyst may be tuned to minimise the production of non-preferential product.

The surface structures preferably have at least one line of symmetry, more preferably, the surface structures have at least two lines of symmetry. This is preferred to allow the conductive solution to surround the tip of the surface structure.

The width of the surface structure where it joins the support substrate is, in some embodiments, between about 20 nm to about 5000 µm, in some embodiments, about 40 nm to about 4000 µm; about 55 nm to about 3000 µm; about 75 nm to about 2500 µm; about 100 nm to about 4000 µm; about 250 nm to about 3500 µm about 20 nm to about 3500 µm; about 2 nm to about 4000 µm; about 20 nm to about 2500 µm; about 20 nm to about 4000 µm; about 20 nm to about 3000 µm; about 20 nm to about 2000 µm. In some embodiments, about 5 nm to about 750 µm; about 5 nm to about 500 µm; about 5 nm to about 100 µm. The particularly preferred surface structures a nano-structures, although micro-structures are also beneficial, depending on the desired product.

The functional surface is preferably at or about an apex of the surface structure. While the whole surface structure can be made of the electrocatalyst material, it is the apex or tip that is considered to be the functional surface that is providing the majority of the catalytic effect to the redox reaction. Preferably, electrochemical activation of the catalyst occurs at a substantially greater rate at the functional surface than activation would occur at another surface position on the electrocatalyst layer.

In some embodiments, the functional surface is at or about an apex of the surface structure and the surface structure is tapered to an apex and/or has a substantially triangular cross-section along a plane parallel to a top surface of the support substrate. The functional surface is, in some embodiments, at or about an apex of the surface structure and wherein the width of the apex of each surface structure is between about 1 nm to about 5000 µm, in some embodiments, between about 10 nm to about 10 µm, or about 20 nm to about 2 µm, or about 30 nm to about 1 µm. In some embodiments, about 1 nm to about 1000 nm, or about 1 nm to about 500 nm, or about 1 nm to about 100 nm, or about 1 nm to about 50 nm. The width of the apex of each surface structure being less than where it joins the support substrate.

In some embodiments, the apexes of the surface structures are separated from each other by about 5 nm to about 1000 µm; about 10 nm to about 1000 µm; about 25 nm to about 1000 µm; about 5 nm to about 750 µm; about 5 nm to about 500 µm; about 5 nm to about 100 µm, apex to apex. In some embodiments, about 5 nm to about 2000 nm; about 5 nm to about 1000 nm; about 5 nm to about 500 nm, apex to apex.

The surface structure(s) of any of the embodiments herein should be understood to encompass any suitable surface features that effectively increase a relative surface area, and/or provide an array of apexes or tips, as compared to a flat, smooth region of equivalent dimension. The size, shape, density, uniformity, arrangement and proportion of the elementary parts of an array of surface structures may vary from the illustrated embodiments.

In an embodiment, the surface structures may be provided with a uniform shape and/or geometry, density and/or size. The surface structures may be shaped, sized, and/or provided in a specific density according to a pre-determined characteristic, such as provision of a number or size of an apex or tip for a particular solution to be catalysed, or a desired apex or tip shape, size, density or uniformity as required.

In alternative embodiments, the surface structures may be provided with non-uniform size, shape and/or density. For example, the surface structures may be provided with uniform projection height and shape, but varying spacing or density. Alternatively, the surface structures may be provided with varying height, but uniform shape and spacing or density. It will be understood that any variation in surface structure shape, size, and/or density may be provided to facilitate a particular reaction or catalysis, by providing an apex or tip, or array of apexes or tips, to act as a functional surface, or have a functional surface formed thereon.

Example shapes of the surface structures may by substantially conical, cylindrical or pyramidal peaked, spiked, square, pentahedron, flat top pentahedron, pentagonal, or hexagonal. In a preferred embodiment, any shape producing an apex or tip suitable for acting as or receiving a functional surface for catalysis may be used.

In a preferred embodiment, a uniform array of surface structures may advantageously provide for a substantially homogenous product or result of catalysis from a solution. This may be due to a uniform ridges, apices and/or tip sizes and shapes of each surface structure, which may provide for a uniform current density across each surface structure apex or tip.

In alternative embodiments, a non-uniform array of surface structures may advantageously provide for an ability to generate multiple products or results of catalysis from solution. This may be due to varying sized apexes or tips of varying geometry surface structures in such a non-uniform array resulting in a varying current density at the apex or tip. For example, a first group of surface structures may be uniform in size and a second group different in size to the first is also uniform in size within the second group.

FIG. 1 shows an embodiment of the invention in which the electrocatalyst array 400 comprises a support substrate 410, surface structures 415 and a functional surface 420. The functional surface is formed of the electrocatalyst (e.g. Pt, Au, Ni) which is activated via electrochemical modification via the current or voltage between the electrocatalyst and the counter electrode.

The array optionally includes a catalyst at the apex of the surface structure and a co-catalyst in the valleys between the surface structures.

The active species is in some embodiments electrochemically modified following contact with the functional surface and the thermodynamic efficiency and kinetic efficiency of the electrochemical modification in comparison to a flat electrode is improved compared to a corresponding flat electrode.

In some embodiments, the electrocatalyst array comprises part of a system. The system contains suitable wiring, seals, electrodes, and solutions to enable a sample to contact the functional surface and electrochemical modification of the active species to occur. The system preferably comprises a container, a pathway (for example, in or for an electrode stack configuration), or other vessel to retain the conductive solution on the functional surface. The array system also preferably further comprises a reference electrode and a counter electrode configured so as to contact the conductive solution during the redox reaction. Preferably the reference and/or counter electrode are stationary and at a fixed distance from the functional surface. Suitable systems and configurations would be known to those of skill in the art.

It will be apparent to a person skilled in the art that the electrocatalyst array ("working electrode") can be acting as an anode where an oxidation reaction is taking place or as an cathode where a reduction reaction is taking place. The term "working electrode" is often used in the art to describe the electrode at which the reaction of interest is happening. However, a counter electrode is required to balance the redox charge. For example, where an oxidation is taking place at the working electrode, a reduction will take place at the counter electrode.

In some embodiments, the counter electrode can also be used to carry out useful redox reactions. In such case the counter electrode may be flat or an array structure. In some embodiments the counter electrode comprises a support substrate and surface structures, such as described in relation to the electrocatalyst array. All the features of the surface structures described herein in relation to the electrocatalyst may apply to the counter electrode. The surface structures of the counter electrode can be the same size and/or geometry as the electrocatalyst or can be a different size and/or geometry to the electrocatalyst.

Alternatively, the counter electrode of any embodiment of the invention comprises a substantially inert conductive material. In this instance the term inert means that the counter electrode is substantially unchanged in mass and state following the establishment and passing of the current from the electrocatalyst to the counter electrode. Therefore, an "inert" counter electrode is substantially unreactive with respect to the components of the solution. Preferably the counter electrode is formed from a material selected from the group consisting of a metal, Pt, Gold, nickel, copper, iron, carbon, graphite, graphene, carbon fibre, carbon nanotubes, a fullerene, conducting polymer PPy, PA, Polycetylene, stainless steel. The counter electrode may be made of a solid layer or the conducting layer deposited onto a suitable support e.g. polymer glass, metal. The counter electrode may be made of a solid layer or the conducting layer deposited onto a suitable support e.g. polymer glass, metal. Preferably the counter electrode is a bare metal (such as Au, Pt, Stainless steel, and/or copper), or an Au or Pt plated substrate (such as metal, polymer and/or glass).

Preferably the counter electrode of any embodiment of the invention is in a fixed orientation with respect to the surface structure.

Preferably the counter electrode of any embodiment of the invention is attached to the electrode array.

Preferably the counter electrode is held in an orientation to minimise differential in distance between each of the surface structures of the array. Preferably the orientation of the counter electrode is above an upper surface of the array. In these embodiments, the distance from the counter electrode to the apex of each surface structure is substantially equidistant. This minimises detection noise caused by the placement of the counter electrode.

It is therefore preferred that the counter electrode is (a) in a fixed orientation with respect to the surface structure, (b) attached to the electrode array, (c) held in an orientation to minimise differential in distance between each of the surface structures of the array, or (d) above an upper surface of the array.

In one embodiment, the solution further comprises a reference electrode. The reference electrode assists with and measurement and control of the voltage while current is flowing, for example during the deposition process. Properties and positioning of the reference electrode will be known to those of skill in the art.

Preferably the electrode array further comprises a reference electrode in contact with the solution. Preferably the reference electrode comprises an electrode formed from Ag/AgCl. Other options will include: Standard hydrogen electrode (SHE); Normal hydrogen electrode (NHE); Reversible hydrogen electrode (RHE); Dynamic hydrogen electrode (DHE); Standard calomel electrode (SCE); Copper-copper(II) sulfate electrode (CSE); Mercury-mercurous sulfate electrode; Pt, Stainless steel, Au Preferably, the current established between the electrocatalyst and the counter electrode as measured at the electrocatalyst is an oxidising or reducing current. This facilitates electrochemical modification of the active species following contact with the functional surface of each surface structure.

Preferably the current comprises a reductive or oxidative potential between the counter electrode and the electrode surface. Preferably the potential is between about −2V and +2V, between about −200 mV and −1V, or about −400 mV relative to a silver/silver chloride reference electrode.

Preferably, the current of any embodiment of the invention is pulsed between an activating potential and an inactivating potential. This pulsing enables the reaction taking place at the functional surface to be localised. Pulsing also maximises the amount of the active species being attached to the apex of each surface structure, and minimises the diffusion of active species away from the apex of each surface structure into solution. The frequency of pulsing, and its duty cycle defines the extent of localisation on the function surface. The regular on/off cycling results in deactivation of the active species therefore the spread of the activated active species from the functional surface to other positions on the array is minimised.

Before a current is applied, the sensory agents remain inactive and the active species present within a solution cannot bind to the sensory agents. Upon application of an activating potential, the charge density (voltage or current) at the functional surface is increased thus activating any active species which diffuse to the functional surface.

Accordingly, the current of any embodiment of the invention is pulsed between an activating potential and an inactivating potential.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the scope of the invention.

EXAMPLES

Materials

PBS pallets, $K_3FeCN_6$, $K_4FeCN_6$, $K_2PtCl_4$ and thiols where purchased from Sigma Aldrich and were used as received.

The electrodes used in these experiments were gold coated polycarbonate. The electrode array was made from polycarbonate into which a series of pyramids were embossed. The micro-pyramidal structures had tip to tip (apex to apex) spacing of 70 μm and a base of 50 μm×50 μm. The size of the tip is between 1 and 5 micron. The height of the micro-pyramids is about 35 micron.

The nano-pyramids where purchased as a nickel stamper and comprised a series of tips that were 250 nm at the base and between about 3 nm and 10 nm at the tip. Tip to tip spacing (the apex of the surface structure to the apex of the next surface structure) was about 250 nm and the size of the tip was between 3 nm and 10 nm. The height of the nano-pyramids is about 250 nm.

Electrochemical Studies

Electrochemical studies were carried out by using a Pine E-chem bipotentiostat station via a three electrode setup with platinum as the counter electrode. All electrochemical potentials presented in this work are measured and reported using a leakless Ag/AgCl miniature reference electrode (eDAQ). The electrochemical cell was confined by a cylindrically bore Teflon cone (4 mm inner diameter) pressed against the sample. All measurements were performed at room temperature without exclusion of air.

Self-Assembled Monolayer (SAM) Formation

Deposition solutions were made by dissolving the desired amount of alkane thiol in ethanol. The total thiol concentration was kept between 0.1 and 1 mM. Freshly prepared gold substrates were immersed in the deposition solution for 24 H. Deposition took place in the absence of light as to eliminate any photon-oxidation on the thiol monolayers. The substrates were then rinsed with ethanol and deionised water to remove excess adsorbate, and then dried with N2 to remove residual solvent.

Example 1

SAM Removal at the Tip

Aim: To demonstrate that charge density (voltage or current) distribution of an electrode array with surface structures can be used to selectively remove the self-assembled monolayer from the apex of surface structures.

Method: SAM coated electrodes were immersed in PBS solution. Desorption was carried out by chronoamperometry by applying a reductive potential (−1.1 v for cumulative duration of 0 s, 2.5 s, 5 s, 10 s, 20 s, 40 s, 80 s, 160 s, 320 s, 640 s, and 900 s), and the desorption rate was monitored using cyclic voltammetry in $K_3FeCN_6$ at 20 mV/s.

Figure 2A:
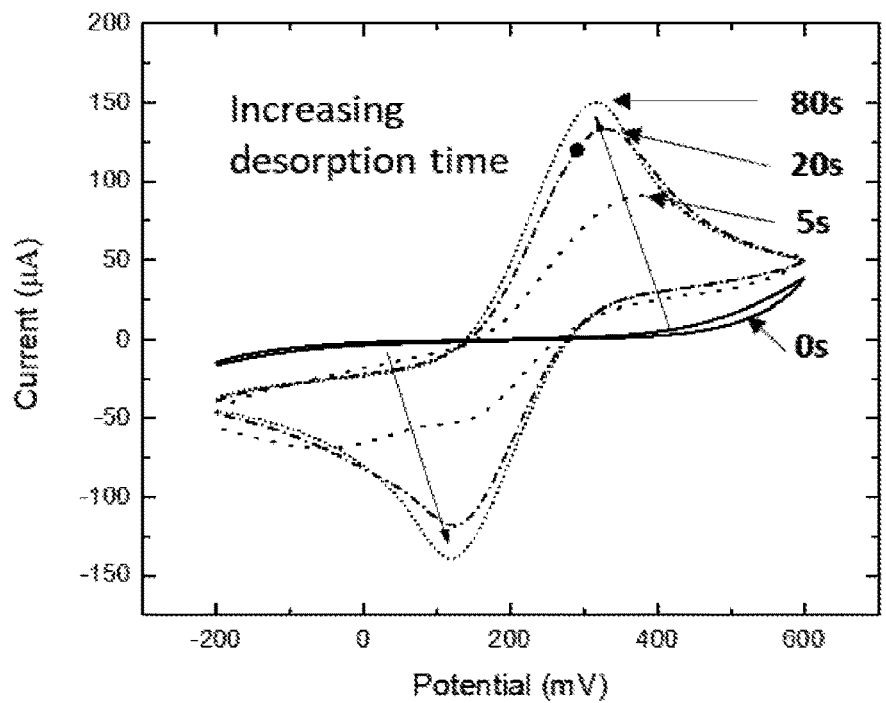
FIG. 2a shows the rapid electrochemical desorption of SAM from a 3D pyramidal electrode surface
Figure 2B:
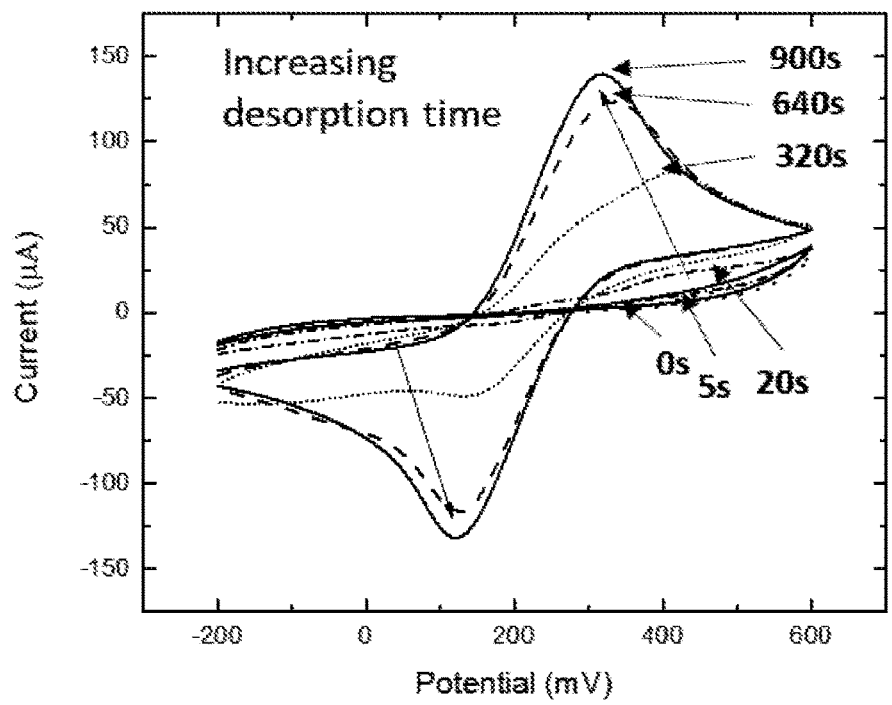
FIG. 2b shows the slower electrochemical desorption of SAM from a flat electrode surface
Figure 2C:
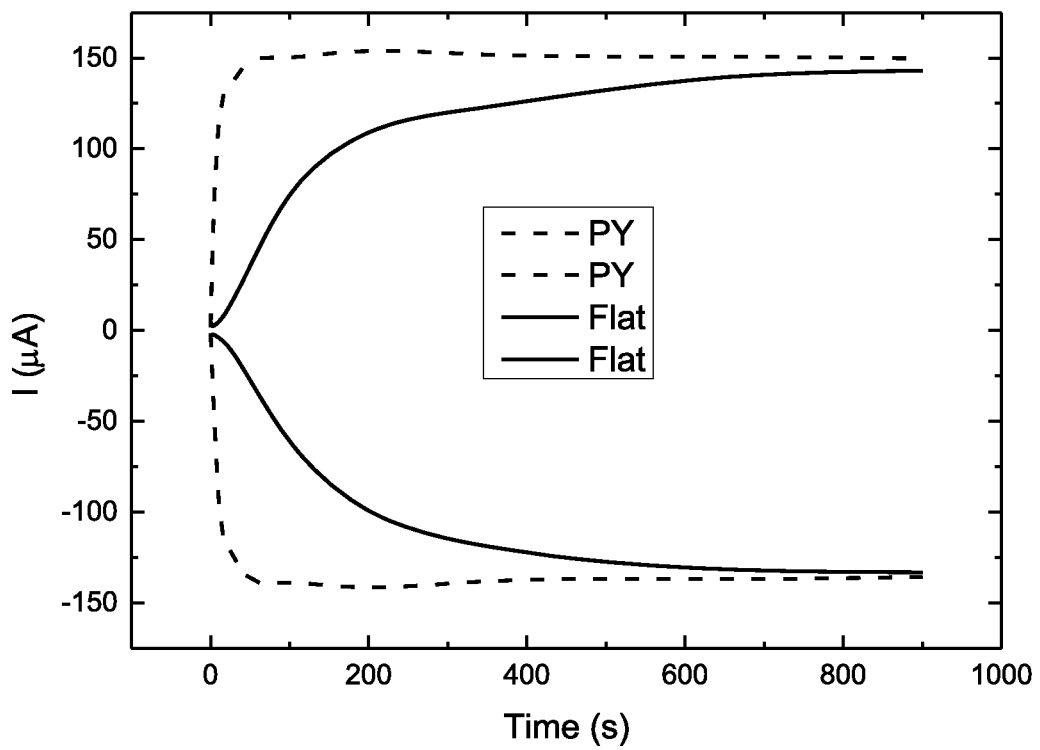
FIG. 2c shows the kinetic trace of electrochemical desorption of SAM in 3D and flat electrode surfaces

Results: The gold coated surface structures on the electrode arrays demonstrated a faster desorption profile with a maximum oxidation peak occurring after approximately 10 seconds (FIG. 2a) relative to the flat electrode (FIG. 2b) with a maximum oxidative peak being seen after approximately 20-30 minutes Conclusion: Differential charge density (voltage or current) distribution of a three-dimensional surface resulted in a significantly faster desorption of SAM from the tips of the surface structures compared to a flat surface (FIG. 2c). This occurred due to the concentration of charge density (voltage or current) at or about the apex of the surface structures. This provides opportunities to modify the functional surface of the electrocatalyst or expose only the tip, i.e. the functional surface of the electrocatalyst.

Example 1b

SU8 Passivating Layer

Aim: To demonstrate that charge density (voltage or current) distribution of an electrode array can be increased by the application of a photoresist coating in the valley between the tips Method: Gold coated electrodes had SU8 spun coated onto the surface at between 2000-5000 rpm, and cross-linked by exposure to UV. This is to give the thickness of passivating layer in the range of 10 μm to 30 μm.

Figure 3:
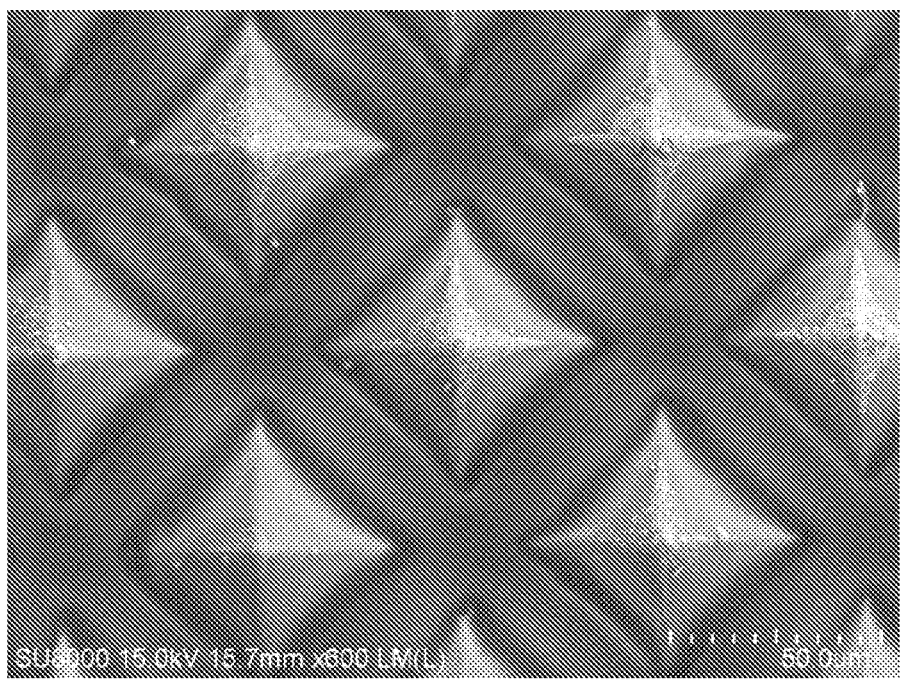
FIGS. 3, 4a and 4b show SEM images illustrating the Pt deposition at the apex of a group of surface structures.

Results: Platinum was electrochemically reduced onto the exposed tips formed as a series of nano-particles as a result of current focusing (see FIG. 3).

Conclusion: Differential charge density (voltage or current) was accentuated by the passivating layer and induced formation of nano-particles instead of a film which can lead to enhanced catalytic activity.

Example 2

Pt Functionalization at the Tip

Aim: To demonstrate differential charge density (voltage or current) distribution of an electrode array with surface structures can be used to selectively deposit metals at the apex of the structures.

Method: Surface structures with a gold electrocatalyst layer were cleaned using reactive ion etching (RIE) with $O_2$ plasma (2 min) and immersed into a Platinum (IV) chloride (1 mM) solution in PBS. The growth of Pt meso-particles was carried out using a square wave potential as follow; a reductive potential (−500 mV) was applied to reduce Pt(II) to Pt (0) on the surface for 15 s, followed an oxidative potential (300 mV) to stop the process. This cycle was continued until the desired amount of deposited Pt was obtained.

Figure 4A:
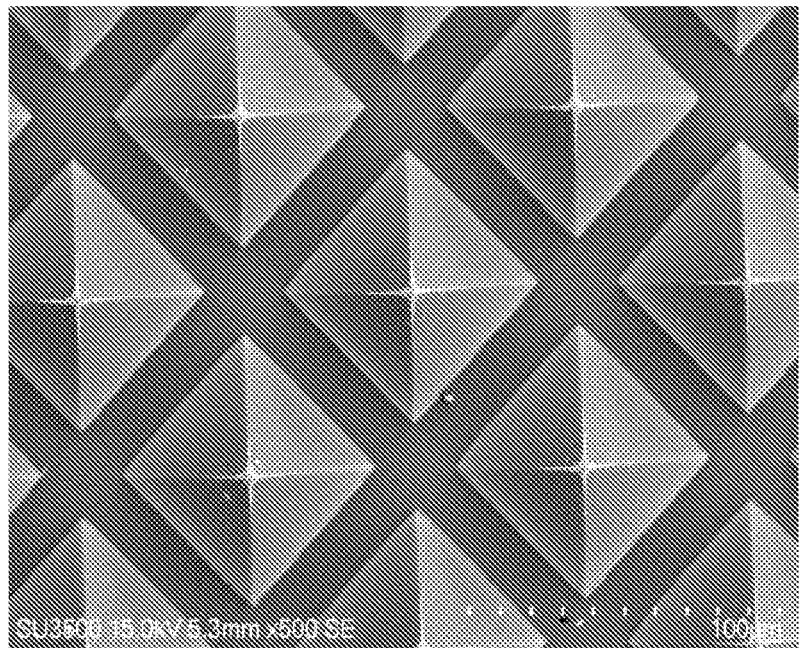
Figure 4B:
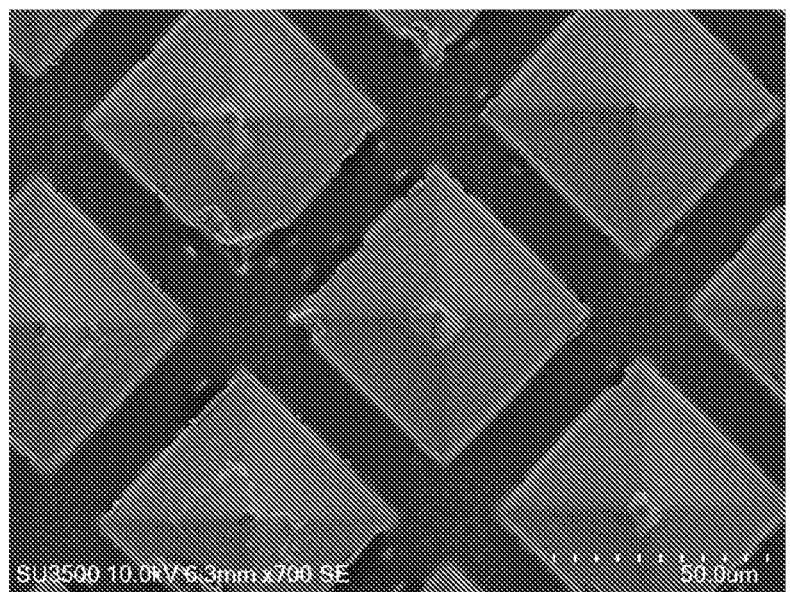

Results: The Pt deposition occurred predominantly at or about the apex of the surface structures as shown in FIGS. 4a and 4b (without passivating) and FIG. 3 (with SU8 passivating layer).

Conclusion: Due to the higher charge density (voltage or current) distribution at or about the apex of the surface structure, Pt is deposited at a higher density there than on other surfaces. This provides opportunities to modify the functional surface of the electrocatalyst.

Example 3

Nano-Scale Catalysis With Transition Metals and Change in Mechanism

Aim: to demonstrate that the three dimensionality of the electrocatalyst changes the mechanism of reaction and its efficiency in conversion to product by minimising electrons "leaking" by generation of side product. This lowers the catalytic efficiency and can lead to generation of reactive damaging side products Method: four electrode system (Pt, $H_2O_2$ collector working electrode 2, and Au electrode as $O_2$ reduction catalyst working electrode 1) was used with Pt as the counter and Ag/AgCl as the reference to measure level of hydrogen peroxide generated during the oxygen reduction reaction by flat, micro-pyramidal and nano-pyramidal structured surface. The height of the collector (Pt) was calibrated by lowering the Pt working electrode until it reached the surface of the Au electrode. From this baseline, it was raised to distance of 200 µm. Cyclic voltammogram was performed on gold electrodes while the Pt electrode was held at a oxidising potential sufficient for $H_2O_2$ oxidation. The efficiency of the $O_2$ reduction was then evaluated as the ratio of the Pt current relative to Au.

Figure 5A:
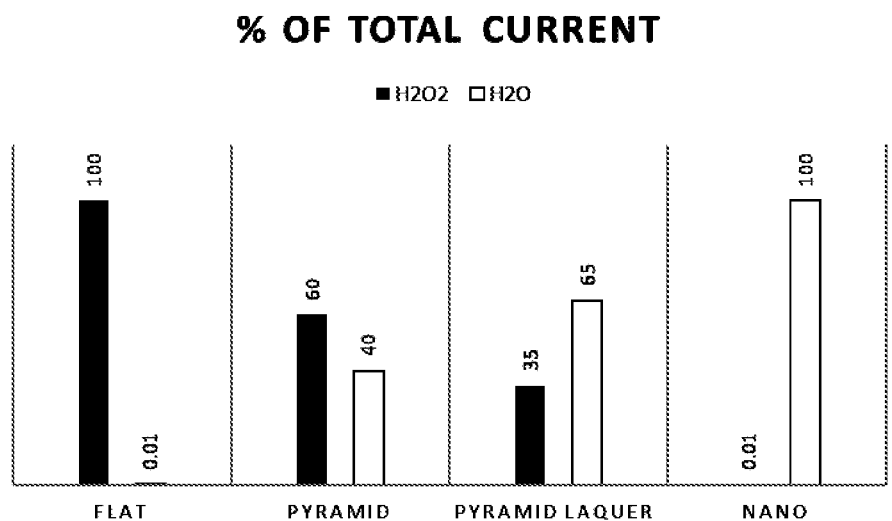
FIG. 5a illustrates a systematic change in the mechanism of the $O_2$ reduction reaction from a pure 2 electron process on a flat electrocatalyst to a partially 2 electron and partially 4 electron process on a micro-pyramidal structured electrocatalyst with and without an insulating layer, to a pure four electron process on nano-pyramidal structured electrocatalyst. The various gold electrodes used in the example are depicted in FIG. 5b.
Figure 5B:
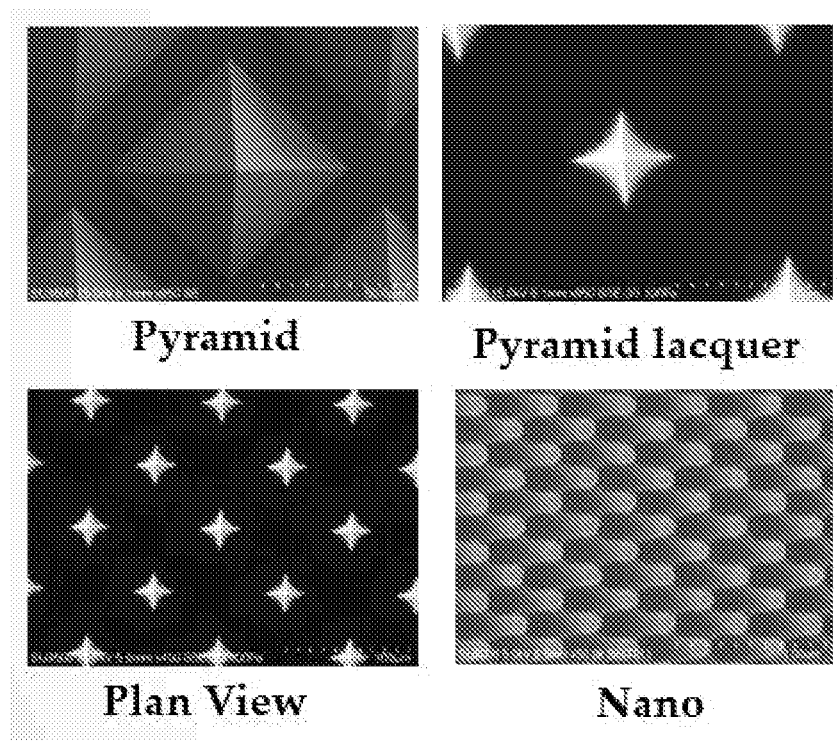

Results: The results are shown in FIG. 5a for the various gold electrodes (as depicted in FIG. 5b): flat, micro-pyramid, micro pyramids isolated by an inert layer between the tips of the pyramid (referred to as pyramid lacquer in the Figure) and nano-pyramidal at pH13. Typically, under these conditions gold is known to generate pure $H_2O_2$ (hydrogen peroxide) in electrochemical $O_2$ reduction in alkali medium. Hydrogen peroxide would therefore be the assumed product for this type of reaction. Introducing three dimensionality, in particular the nano-structures, but to a lesser extent the micro-structures, unexpectedly changes the mechanistic behaviour by going from 2 electron reduction (100% $H_2O_2$) to four 4 electrode reduction (100% $H_2O$). This only became apparent when the hydrogen peroxide recovery was measured.

The above example (as depicted in FIGS. 5 and 5a) shows that changing the size and/or the shape of the 3D structure can lead to the formation of different products from the catalytic process, e.g. $O_2$ to peroxide or to water. This can also be applied to all the examples cited below, including but not limited to $N_2$ to $NH_3$, $NO_3$ to $N_2$ and $CO_2$ to HCOOH.

The size of the tips selected is dependent on the desired product. The smaller the feature sizes the more efficient is the conversion to the end product, and especially where multiple products are possible, to a greater concentration of the higher energy product.

It is considered that the apex and/or tip and/or edge of the structure (the functional surface) is one of the most important factors in determining the activity of the electrocatalyst. It is considered that the section of the apex and/or tip size can be used to select the desired redox product. In general terms, the sharper, or smaller, or more acute the angle of the apex, or apices (or edges) and/or tip, the greater the current and voltage focusing and the higher the catalytic turn-over.

Conclusion: surface topography of the electrocatalyst results in dramatic change in reaction mechanism.

Example 4

Electrocatalytic Reduction of $CO_2$

Aim: To demonstrate the diversity of nano scale electrocatalysis by reduction of $CO_2$.

Figure 6:
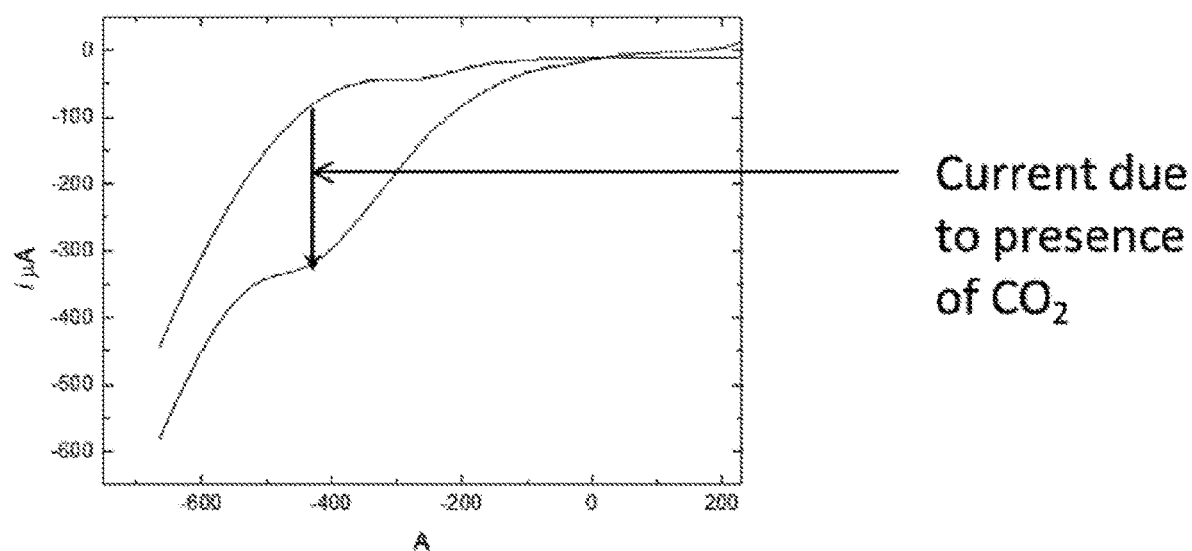
FIG. 6 illustrates the absence of current in the background CV (upper line) and increased catalytic current due to introduction of $CO_2$ (lower line).

Method: A three electrode system was used with nano structured Au surface as the working electrode, Pt as the counter and Ag/AgCl as the reference. The solution was first degassed by purging with Ar gas, and a background measurement was taken by cyclic voltammetry. $CO_2$ was then introduced by vigorous bubbling, and $CO_2$ reduction activity was measured by cyclic voltammetry Result: The results are shown in FIG. 6. In FIG. 6, significant current was observed when $CO_2$ was introduced, resulting in formation of CO and Methanol.

Conclusion: the electrocatalyst used here demonstrated capacity for $CO_2$ reduction Example 5

Electrocatalytic Reduction of $O_2$ by Pt

Aim: to demonstrate that the three dimensionality of a mechanistically efficient electrocatalyst enhances the catalytic activity by reducing the energy cost (thermodynamic) of the process and while enhancing its kinetic efficiency.

Method: Pt catalyst (30 nm) was sputtered onto flat, micro-pyramid and nano-pyramidal surfaces. A three electrode systems was used with Pt wire as the counter and Ag/AgCl as the reference to measure $O_2$ reduction activity of each surface. Cyclic voltammogram was performed on Pt coated electrodes w. The efficiency of the $O_2$ reduction was then evaluated as by the onset potential (measure of thermodynamic gain) and maximised current (measure of kinetics).

Figure 21:
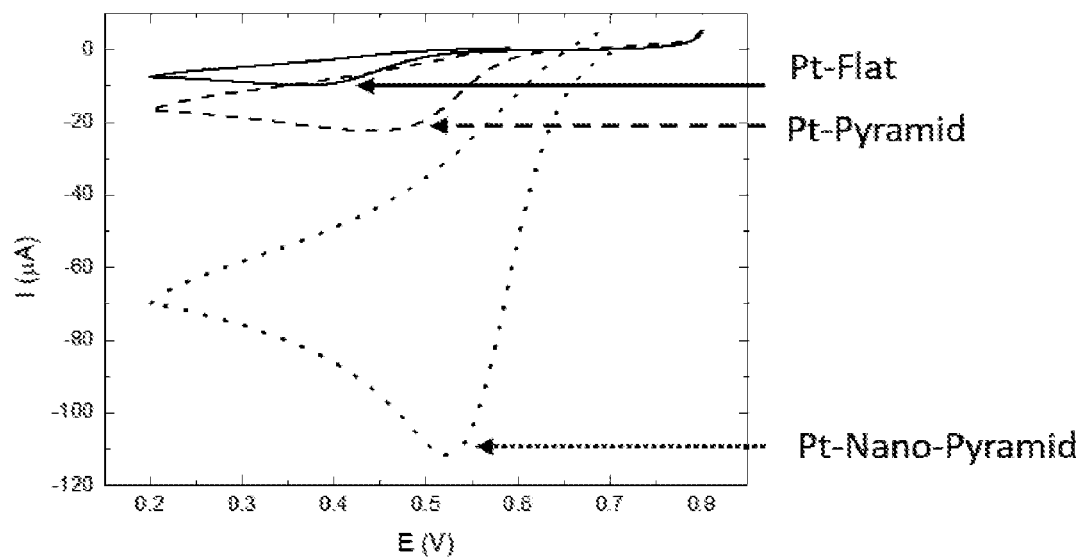
FIG. 21 shows the reduction of oxygen on Flat, Pt-Pyramids (50 µm) and Pt-Nano-pyramids (250 nm).

Results: The results are shown in FIG. 21 for the various Pt coated electrodes: flat, micro-pyramid and nano-pyramidals at pH2. The inventors observed a significant shift in the onset potential in the order of Flat<micro-pyramid<<nano-pyramidal surfaces. This trend (Flat<micro-pyramid<<nano-pyramidal) was also observed in the relative current generated.

Conclusion: surface topography of the electrocatalyst results in dramatics enhancement of heterogeneous catalysis both in energy cost and catalytic kinetics.

Example 6

Ascorbic Acid pH Dependency, Tafel, Concentration Dependence

Figure 7A:
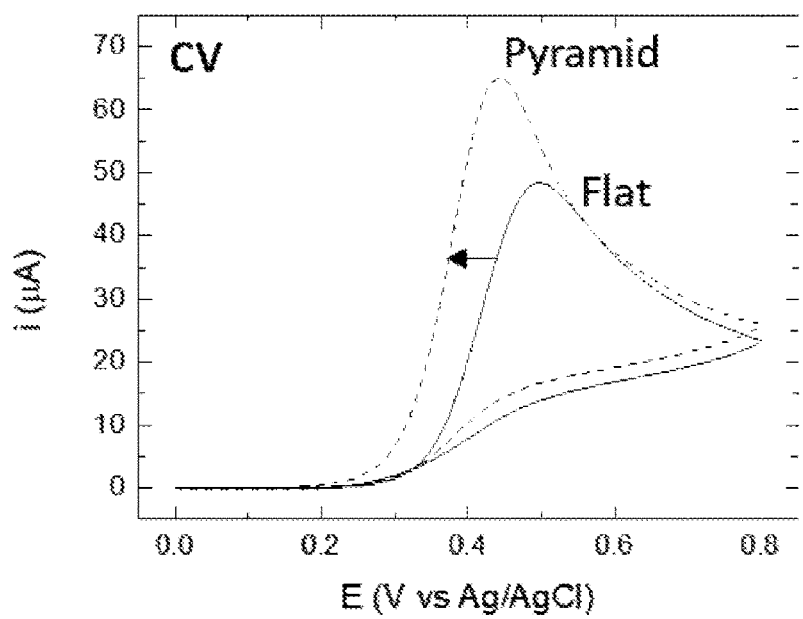
FIG. 7a shows the CVs for an organometallic catalyst (ferrocene) on flat and 3D pyramidal electrode surfaces.

Aim: To demonstrate the generality of the potential shift under different conditions Method: A three electrode system was used with Pyramidal structured Au surface as the working electrode, Pt as the counter and Ag/AgCl as the reference. Ferrocene was immobilised on both Flat and pyramidal electrode using differential current distribution electrochemical surface modification. The experiment was carried out such that surface coverage of Ferrocene on both flat and pyramid were comparable (FIG. 7a). Electrochemical conversion of 1 (FIGS. 7a and b) and 100 mM sodium ascorbate were carried out in 1-14 pH range.

Results: Ferrocene is known to facilitate the oxidation of ascorbate when incorporated into a SAM-modified gold electrode. It is known that oxidation of ascorbic acid is a two-electron two-proton oxidation process that yields a single product. As a result, there would be an expected pH shift in its oxidation process. With ferrocene attached to N3-C11SH/C10SH, the current rises, peaks, and decreases showing a diffusion limited process. Similar to the hydrogen production and oxygen reduction when using a substantial decrease in the voltage required to initiate the oxidation process was observed with increased catalytic performance (FIG. 8a). This catalytic enhancement is observed at all pH units.

Figure 7B:
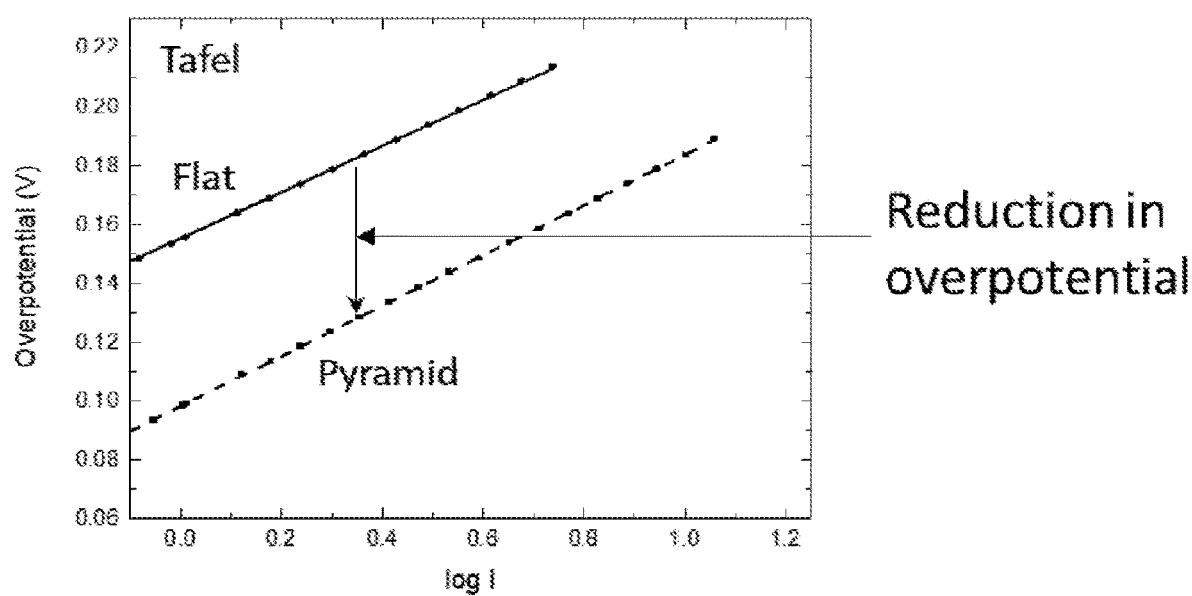

The Tafel plot clearly indicated a reduction in both the thermodynamic cost and exchange current density (FIG. 7b).

Conclusion: The 3D shape electrochemically differentiates the activity of the tip from the base even though it is the same material. Catalysis is improved by reducing the energy cost for the transformation by reducing the activation energy and improve the rate that the reaction occurs in different environments.

Example 7

$O_2$ Reduction by Au Electrode

Figure 8:
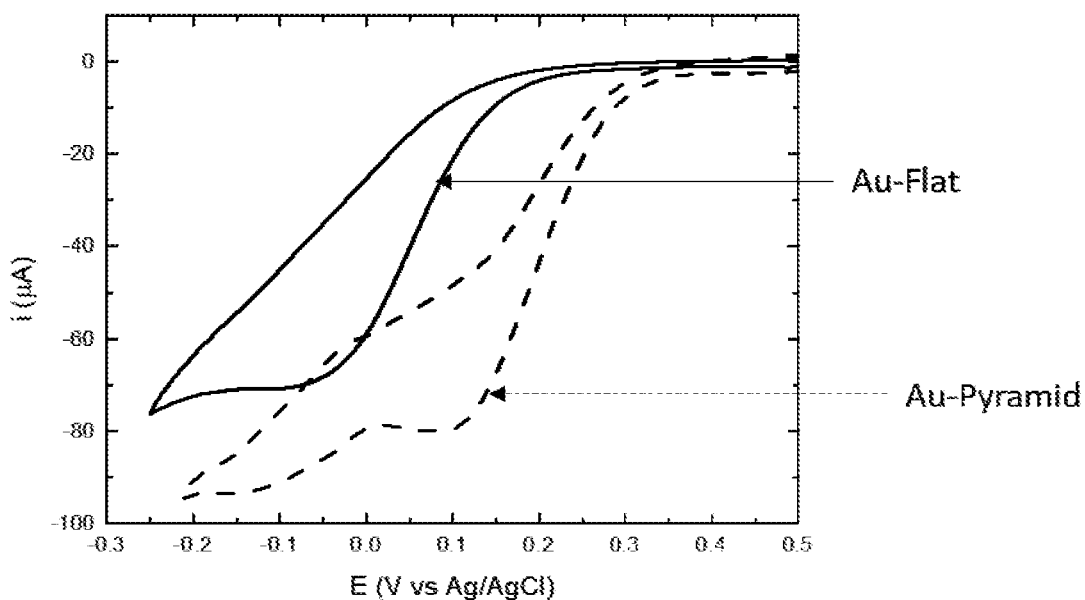
FIG. 8 shows the oxygen reduction CV by flat and 3D pyramidal gold electrodes.

Method: A three electrode system was used with Pyramidal structured Au surface as the working electrode, Pt as the counter and Ag/AgCl as the reference. Cyclic voltammetry was performed on gold electrodes in $O_2$ saturated perchloric acid Results: The results are shown in FIG. 8 for flat, and micro-pyramid at pH1. At this pH Au is known to reduce $O_2$ by 4 electrons and 4 protons to water. Introducing three dimensionality, dramatically reduces the onset potential and two peaks are observed one at low overpotential for the apex followed by one at high over potential for flat regions Conclusion: surface topography of the electrocatalyst results in dramatic enhancement of heterogeneous catalysis both in energy cost and catalytic kinetics (FIG. 8).

Example 8

Mass Activity of Catalyst Under Steady State

Aim: to study the influence of three dimensionality on mass activity of catalyst Method: A three electrode system was used with Pyramidal structured Pt was electrodeposited as per example 2 on micro pyramidal structure and flat Au electrode on a 5 mm insert to be used in rotating disc electrode. Cyclic voltammogram was performed at 1600 rpm in $O_2$ saturated perchloric acid.

Figure 9:
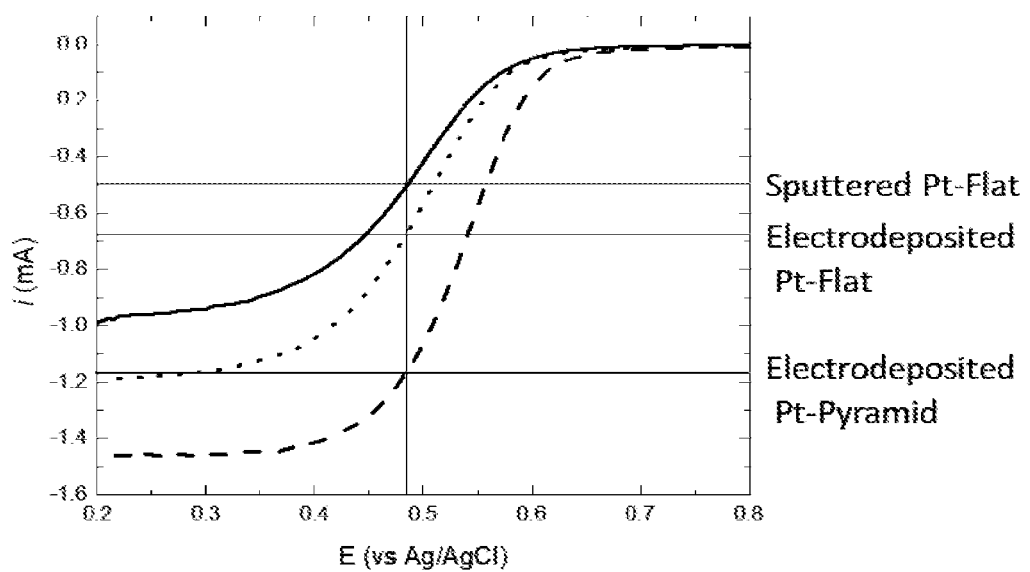
FIG. 9 shows the Linear Sweep Voltammetric plots at 1600 rpm for the various Pt coated gold electrodes.

Results: Similar thermodynamic shift was observed for $O_2$ reduction at 1600 rpm as was for static surface (FIG. 9).

Conclusion: The rotation enhances the mass transport of $O_2$ to the electrode, and minimises any enhancement produced by the three-dimensional surfaces. The rotating disc electrode experiments therefore allowed the mass activity of both the flat and the 3D surfaces to be compared directly without any influence by diffusion effects.

Example 8

Catalytic Activity of Pt/C With Three Dimensionality

Figure 10:
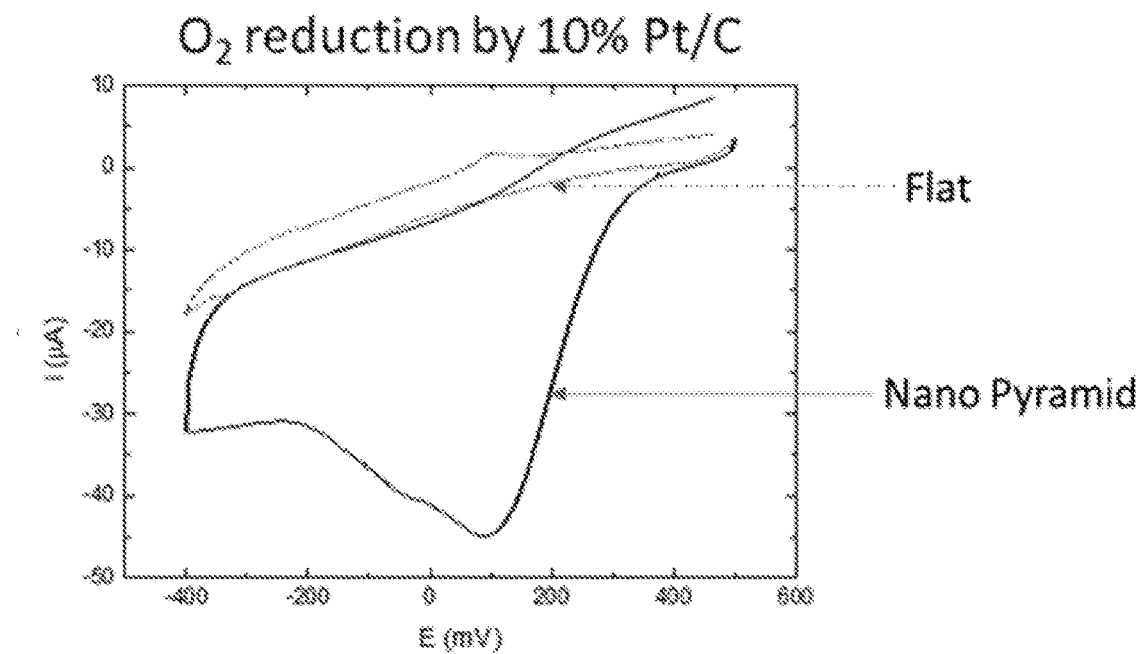
FIG. 10 shows the oxygen reduction by 30% Pt/C deposited onto flat and nano-pyramids.

Aim: To study the electrocatalytic enhancement of three dimensionalities of current state of the art Pt/C Method: 10% Pt/C ink was prepared from previous reported procedure. 10 μL of the ink was the drop casted onto flat and nano-pyramid surfaces. $O_2$ reduction activity was then carried out in $O_2$ saturated NaOH solution. Results: significant enhancement in catalytic activity of Pt/C was observed for three dimensional platform (FIG. 10) relative to a flat surface.

Conclusion: three dimensionality can be used to enhance catalytic performance of existing materials.

Example 9

Conversion of Nitrate to Nitrogen

Aim: To apply the 3D catalytic surface to the reduction of nitrate

Method: A three electrode system was used with nano-Pyramidal structured Au surfaces as the working electrode, Pt as the counter and Ag/AgCl as the reference in PBS buffer. The CVs were performed with and without the addition of 6 mmol sodium nitrate.

Figure 11:
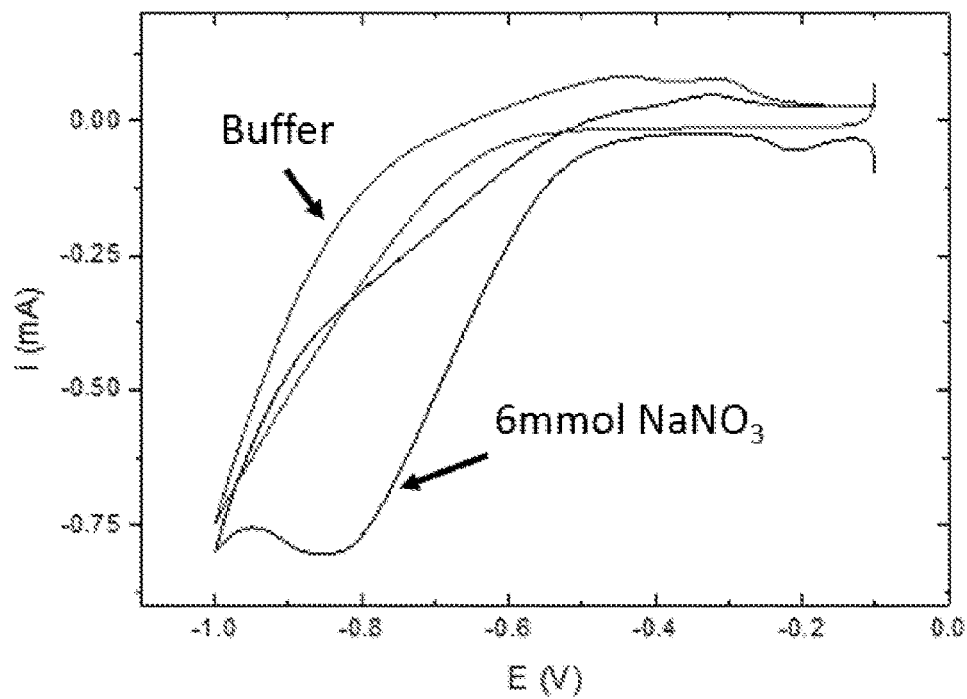
FIG. 11 shows the effect of three dimensionality on the reduction of Nitrate to Nitrogen.

Results: Upon addition of the sodium nitrate to the solution a peak was seen in the CV at approximately −0.85 mV relative to Ag/AgCl (FIG. 11). Holding the voltage at −0.8 mV resulted in an odourless gas being given off which was thought to correspond to nitrogen.

Conclusion: The CV clearly shows a peak corresponding the reduction of nitrate. The precise identity of the gas being given off is yet to be determine, however the fact of it being odourless eliminates production of ammonia and supports the production of Nitrogen.

Example 10

Enhancement of Kinetics of Electron Transfer to Ferrocene Through a Monolayer Aim: To demonstrate the enhanced kinetic of electron transfer (KET) to an immobilised ferrocene SAM on a three dimensional surface relative to flat.

Method: A mixed self-assembled monolayer (SAM) with an equal molar comprised of 1-Decanethiol and an azide terminated monolayer with a carbon chain of 11 was formed on the surface of a flat and pyramidal gold sputtered surface. A three-electrode system was used with Pt wire as the counter and Ag/AgCl as the reference to attach ferrocene onto the surface via chronoamperometry. Cyclic voltammogram with different scan rates was performed on the electrodes to evaluate the electron transfer mechanism of a flat and pyramidal surface.

Figure 12:
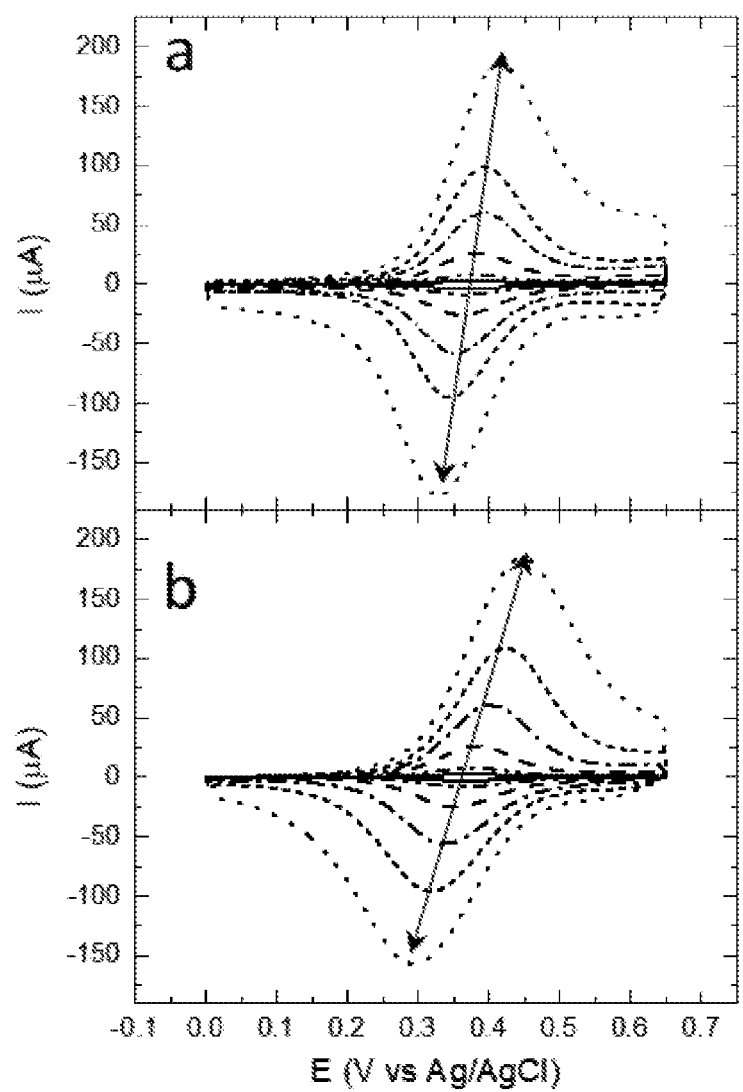
FIG. 12a (upper plot) and 12b (lower plot) show the scan rate dependence for immobilised ferrocene on pyramidal and flat electrode surface respectively.
Figure 13:
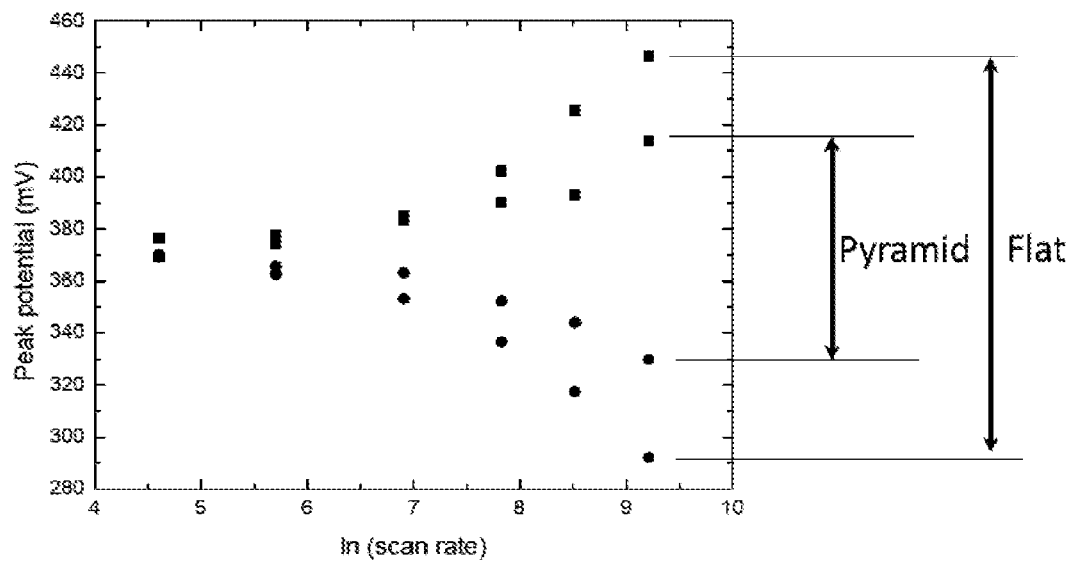
FIG. 13 shows the peak potential vs scan rate for both oxidation and reduction of ferrocene.

Results: The results are shown in FIG. 12 for the pyramid (a) and flat (b) surface at neutral pH. The inventors observed a faster electron transfer using the pyramidal surface, as demonstrated by the smaller difference in peak to peak splitting between oxidation and reduction peak potentials as a function of scan rate (FIG. 13). The results demonstrate more facile movement for an electron to jump between a chemical species and the micro-structured electrode surface, whereas the flat surface exhibited a sluggish rate throughout the experiment.

Conclusion: Surface topography of an electrode results in dramatic enhancement of electron transfer kinetics by reducing the energy cost required Example 11

Electrocatalytic Reduction of $O_2$ by Pt Through Rotating Disk Electrode (RDE) Experiment Aim: To demonstrate that the three dimensionality produces kinetic enhancement and maintains steady-state mass transport conditions with (RDE)

Figure 14:
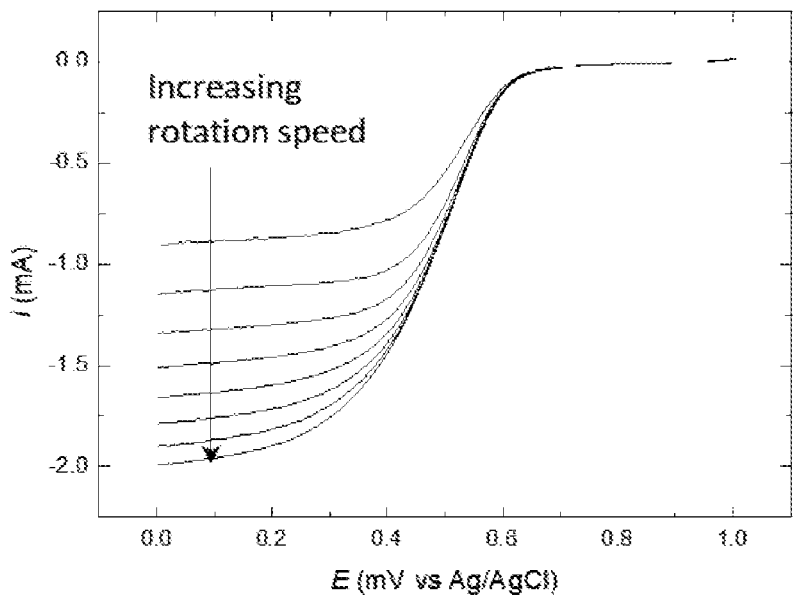
FIG. 14 shows the Rotation frequency pendant for Pt coated pyramidal surface.
Figure 15:
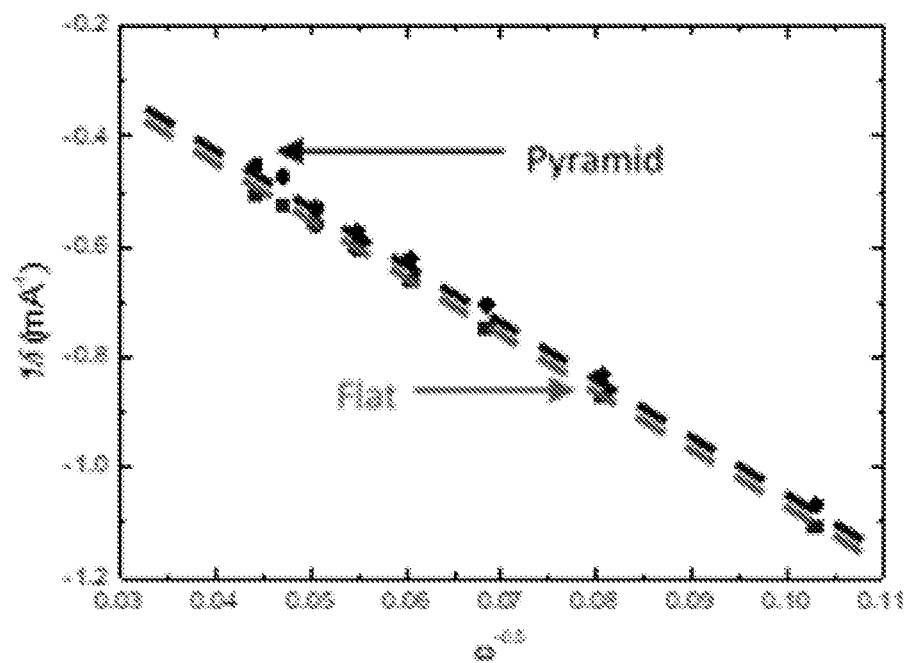
FIG. 15 shows the Koutecký-Levich plot for both pyramidal and flat surface.

Method: Both flat and pyramidal electrodes (5 mm disks) were prepared as per example 5, where Pt catalyst was sputtered. A three electrode system was used with Pt wire as the counter and Ag/AgCl as the reference to measure $O_2$ reduction activity of each surface by performing cyclic voltammetry with rotation rates at 400, 900, 1600, 2500, 3600 and 4900 rpm (FIG. 14). The efficiency of the $O_2$ reduction was then evaluated by the onset potential, maximised current and Koutecký-Levich equation (FIG. 15).

Results: The results are shown in FIG. 15 for the Pt coated micro-pyramid electrode. The inventors observed a significant shift in the onset potential as the rotation rate increases, accompanied by a high current for both surfaces due to the reduction of mass transfer in the system. Koutecký-Levich equation shows a similar slope with a higher electron transfer exhibited by the pyramidal electrodes.

Conclusion: Surface topography of the electrocatalyst results in dramatic enhancement of heterogeneous catalysis both in terms of the energy cost and catalytic kinetics using a three dimensional pyramidal electrode.

Example 12

Figure 16:
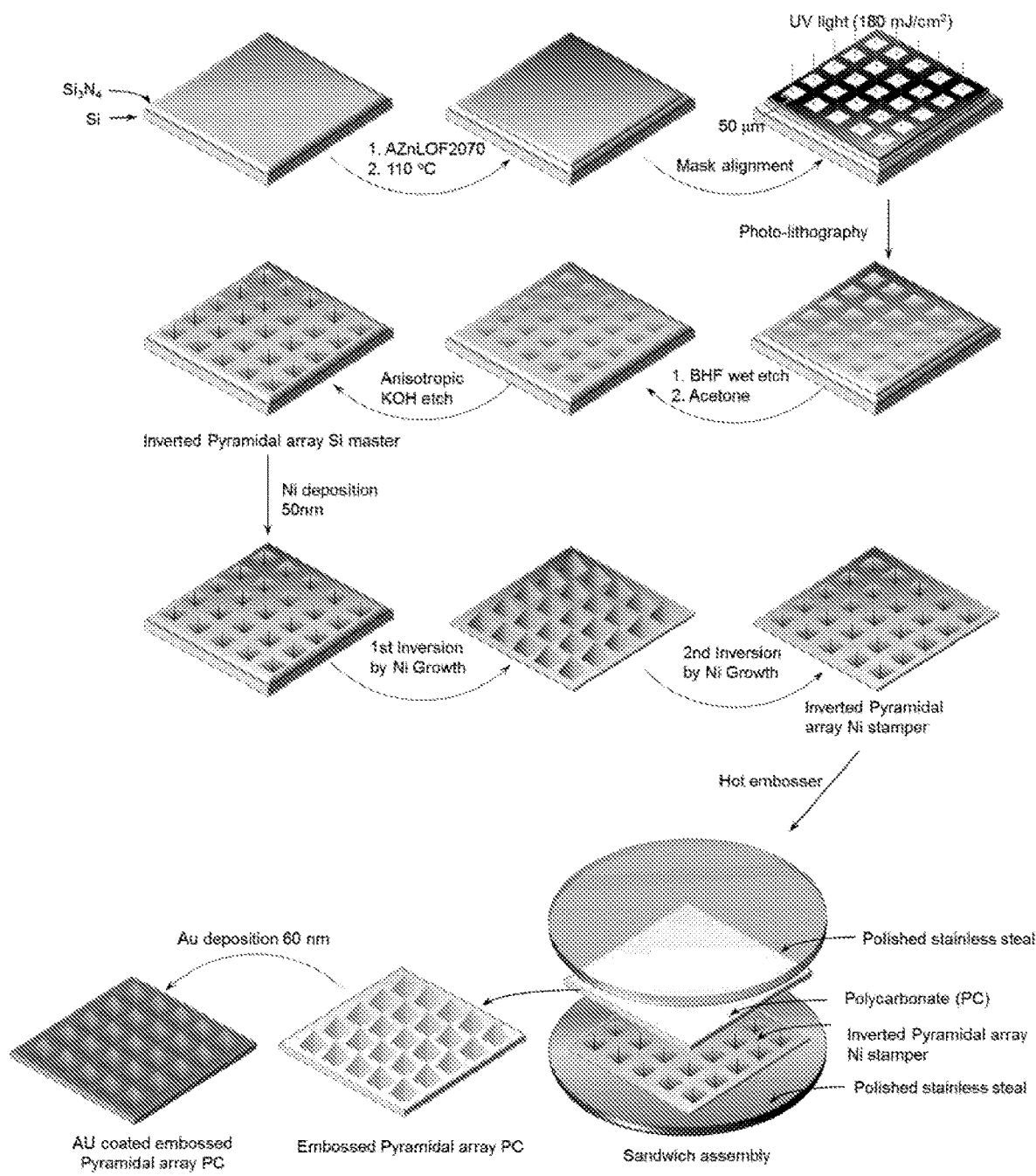
FIG. 16 shows the stepwise process for the fabrication of the 3D electrode array.

Representative Fabrication of a Gold Coated 3D Polycarbonate Array (FIG. 16)

The inverted pyramidal array was fabricated into a silicon (Si) wafer by modification of a previously reported anisotropic wet etching methodology.1 In this report, the inverted pyramidal array micro-structures were fabricated in three steps using silicon nitride ($Si_3N_4$) coated Si (FIG. 16): photolithography was used to define the pyramidal base (50 μm×50 μm) and spacing (75 μm tip to tip), isotropic etching of the Si3N4 layer using buffered hydrofluoric acid followed by anisotropic etching of the Si using KOH solution. The anisotropic etching using the alkaline etchant (30% KOH) leads to the formation of an array of inverted pyramidal microstructures at 54.7°. This angle is dependent on the crystal plane orientation and varies from material to material. It is noted that obtaining a controlled etch rate on a large area is difficult and reproducibility was low due to the complex wet etch parameters.

Figure 17A:
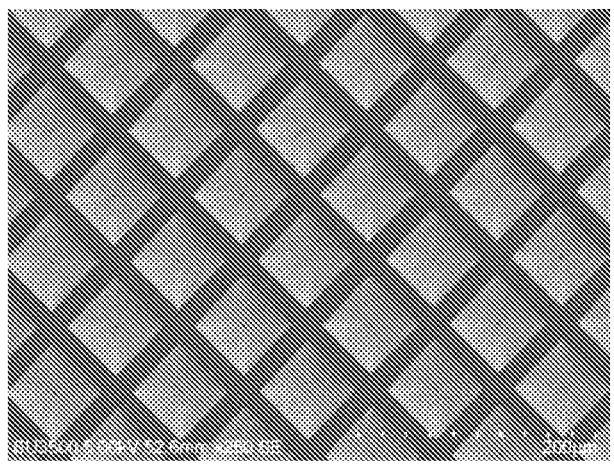
FIG. 17 shows a) SEM images of the silicon master and b) SEM image of the nickel master generated form the silicon master and c) SEM of the embossed gold coated array.

A polished Si [100] wafer coated with Si3N4 (4-7 Ω·cm resistivity) was cleaned with isopropanol. AZ nLOF 2070 negative photoresist was then spun coat onto the wafer at 3000 rpm to give a thickness of 6.5 μm. The resist was then baked at 110° C. on a hot plate for 60 seconds. After cooling to room temperature, the substrate was then transferred to a mask aligner (model) and exposed to UV light (180 mJ/cm$^2$) through a square array patterned mask to define the size and spacing of the inverted array. The substrate was then re-baked at 110° C. for 60 seconds. After cooling to room temperature, the photoresist was developed by exposure to AZ326 MIF for 60 seconds; the surface was then rinsed with deionised water and dried under a flow of nitrogen. The integrity of the lithography process was then examined using an optical microscope after an additional curing for 5 minutes at 140° C. The photoresist pattern was etched into the $Si_3N_4$ layer using buffered hydrogen fluoride solution for 8 hours to minimize over-etching. The wafer was then rinsed with copious amount of deionised water. The residual photoresist was then removed with acetone and washed with deionised water and dried under the flow of nitrogen. The inverted pyramidal array micro-structures were then etched through the Si3N4 mask by anisotropic etching. This was achieved by immersing the wafer into a mixture comprised of 30% KOH aqueous solution with 16% isopropanol at 70° C. for 75 minutes with constant stirring at 300 rpm. Under these conditions, the Si substrate was etched at ~60 microns/hour. The wafer was then rinsed with copious amount of deionised water and dried under the flow of nitrogen before inspecting under scanning electron microscope (SEM) (FIG. 17a).

Figure 17B:
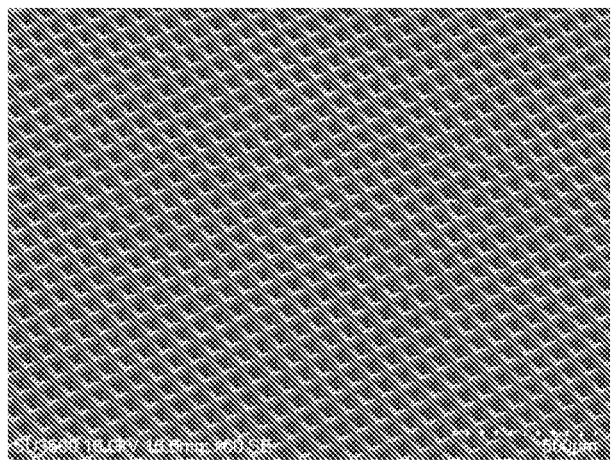

The Ni stamper with the inverted pyramidal array was prepared by two sequential electroforming from the Si master using a previously reported methodology. The first inversion was carried out by sputtering a thin layer of Ni (100 nm) onto the inverted pyramidal array Si master (3 mTorr of argon atmosphere at 200 W, for 180 seconds). The Ni coated substrate was then immediately immersed into a nickel sulphamate solution, containing nickel chloride. Direct current (DC) 2.7 A was then passed between the Ni coated Si cathode (0.015 cm$^2$) and Ni anode for 12 hours at 55° C. During the electroforming the cathode (Ni coated Si master) was rotated at 60 rpm to ensure a homogenous and a continuous electrodeposition. Once the thickness of Ni pyramidal array reached ~350 μm, the power supply was switched off and the electroformed Ni was separated from the Si master, rinsed with copious amount of water and dried under a flow of nitrogen. The Ni pyramidal array is then examined under the SEM and the second Ni to Ni inversion was carried out by repeating above electroforming process to give inverted pyramidal array Ni Stamper (FIG. 17b).

Figure 17C:
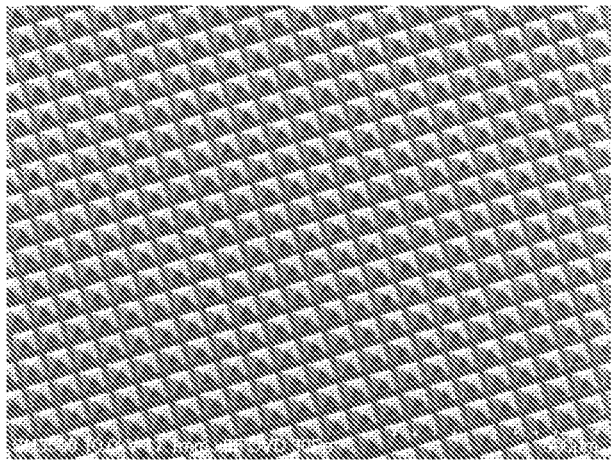

The inverted pyramidal array Ni stamper was stamped into polycarbonate using a hot embosser (YPL-NIL-51402 customized model, Wu Xi Imprint Nano Tech. Ltd.). A sheet of PC (0.5 mm thickness) was placed on top of the Ni stamper, which was then sandwiched between two polished stainless plates and placed into the embossing chamber with the heater facing the Ni side of the stack. The imprinting was carried out under vacuum (1.5×102 Pa) at 220° C. with 1.5 MPa/cm$^2$ of pressure for 15 minutes. The substrate was then cooled to room temperature and the embossed polycarbonate was separated and examined under an optical microscope. The polycarbonate substrate was then immediately coated with gold using direct current magnetron sputtering (Torus Sputtering Machine, Kurt J. Lesker) under a 3 mTorr argon atmosphere at 200 W, for 180 seconds with rotation to ensure uniform deposition to give a thickness of ~60 nm (FIG. 17c).

Example 13

Hydrogen Evolution by Pt Particles on Flat and 3D Electrodes

Aim: To demonstrate that three dimensionality produces enhances the catalytic performance of a catalyst located at the apex of the tip Method: $K_2(PtCl_4)$ (6 millimolar) in PBS buffer was electrochemically deposited onto both flat and 3D SAM coated electrodes using chronoamperometry at −0.4V vs Ag/AgCl.

Results: The method resulted in Pt being deposited as particles on both the flat and 3D electrodes (c.f. Table 2). On the flat electrodes the particles were relatively evenly dispersed over the entire electrode surface, whereas for the 3D electrodes the Pt particles where exclusively located at the apices and the top of the ridges. Table 2 details the parameters for the Pt coated electrodes, and the current densities obtained for the reduction of water to produce Hydrogen.

Conclusion: The results show that Pt particles located at the top of the tips were more than 100 times more active as a result of be located at the apex. The large difference in the current density per platinum area shows activity of the platinum molecule on the structure is 130 times the activity of the same platinum molecule in the flat electrode. The current density can be equated to the activity of the catalyst and the rate of production of production of hydrogen.

The data in Table 2 is for micron sized pyramids, nano sized pyramids give a significantly greater turn-over

TABLE 2

Pt particles on flat vs Pt particles on tips

Figure 25:
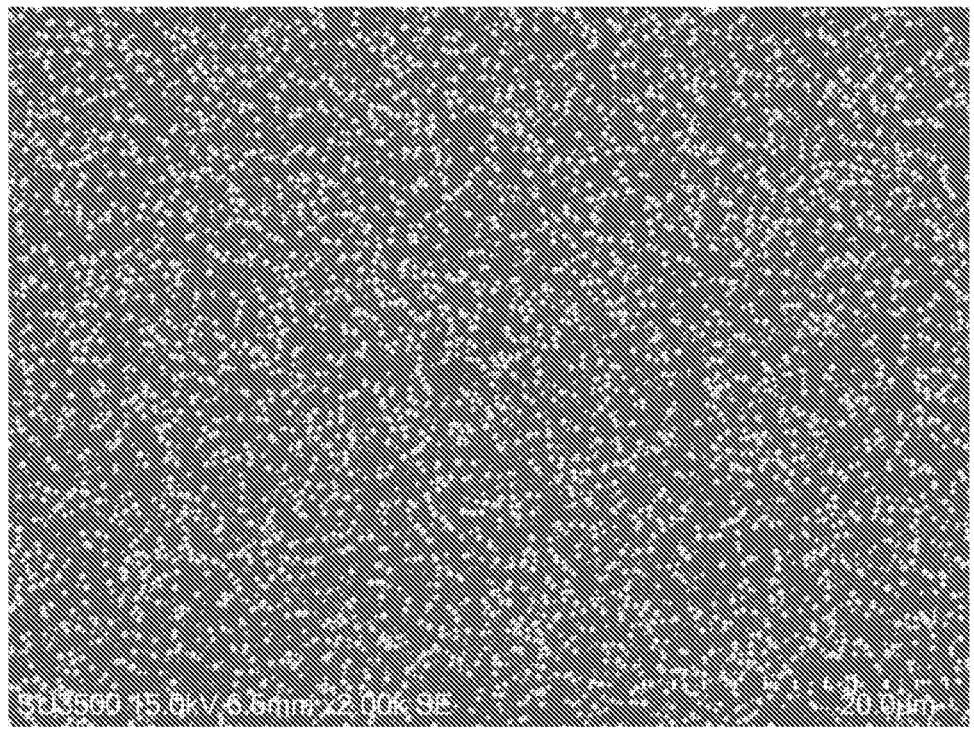
FIGS. 25 and 26 show the structures referred to in Table 2.
Figure 26:
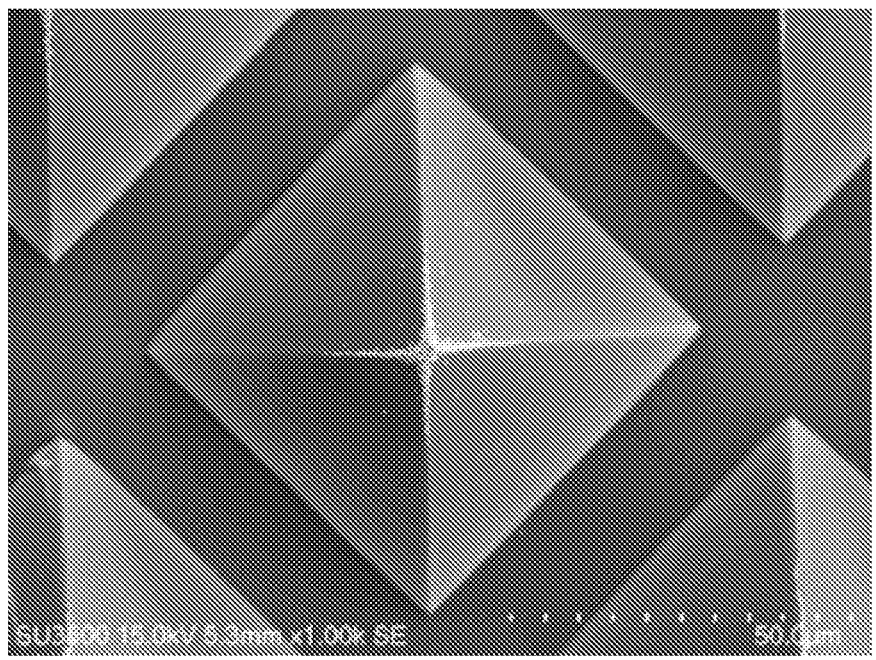

| | Pt NP on Flat Refer to FIG. 25 | PT NP on Pyramids Refer to FIG. 26 |
|---|---|---|
| Particle/(100 µm)$^2$ | 1540 | 160 |
| Average particle size (µm) | 0.6 | 0.2 |
| Average surface area of Pt µm$^2$ | 0.7 | 0.063 |
| Total surface area of Pt/ (100 µm)$^2$ | 1300 | 10.0 |
| Current density (mA/cm$^2$) | 48 | 56.17 |
| Current density/Pt area | 0.04 | 5.6 |

Example 14

Conversion of Nitrogen to Ammonia

Aim: To apply the 3D catalytic surface to the reduction of nitrogen Method: A three electrode system was used with nano-Pyramidal structured Au surfaces as the working electrode, Pt as the counter and Ag/AgCl as the reference in PBS buffer. The CVs were performed with and without the addition of nitrogen to the solution.

Figure 19:
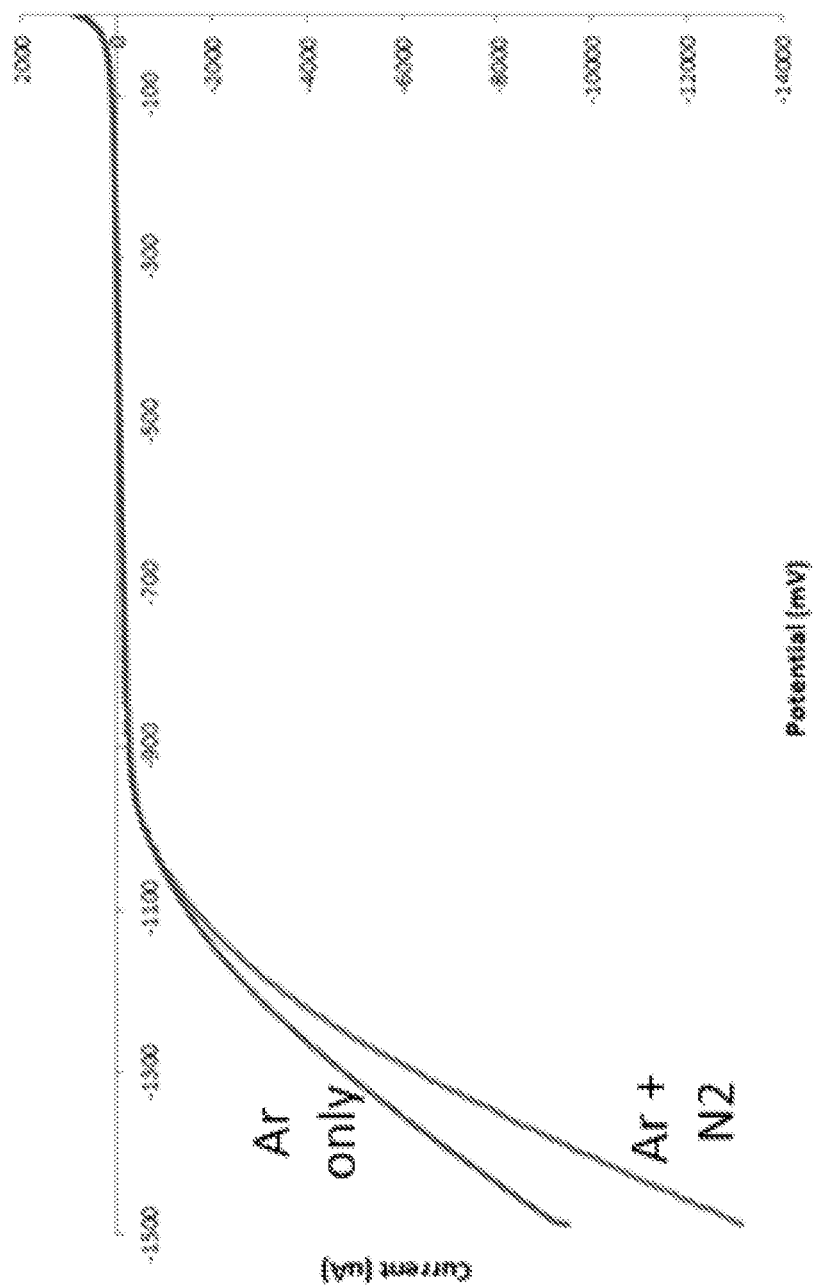
FIG. 19 shows CV of PBS buffer solution bubbled with both Argon (top line) and Argon+Nitrogen (bottom line).

Results: Upon addition of the nitrogen gas a distinct yet reversible deflection in the CV was seen as shown in FIG. 19. This was thought to correspond to the production of ammonia, as confirmed by the appearance of a peak at 420 un the UV-Vis spectrum.

Conclusion: The CV clearly shows a peak corresponding to the reduction of nitrogen. The precise identity of all the products is yet to be fully confirmed, however the appearance of a peak in the UV-Vis supports the production of ammonia.

Example 15

Hydrogen Gas Evolution on Flat and 3D Electrodes

Aim: To demonstrate that three dimensionality produces more gas than flat electrodes, the finer the structure the greater the production. Also, that the 3D structures produce bubbles which are efficiently and constantly cleared from the surfaces of the 3D electrodes, and the smaller the features the smaller the bubbles.

Figure 18:
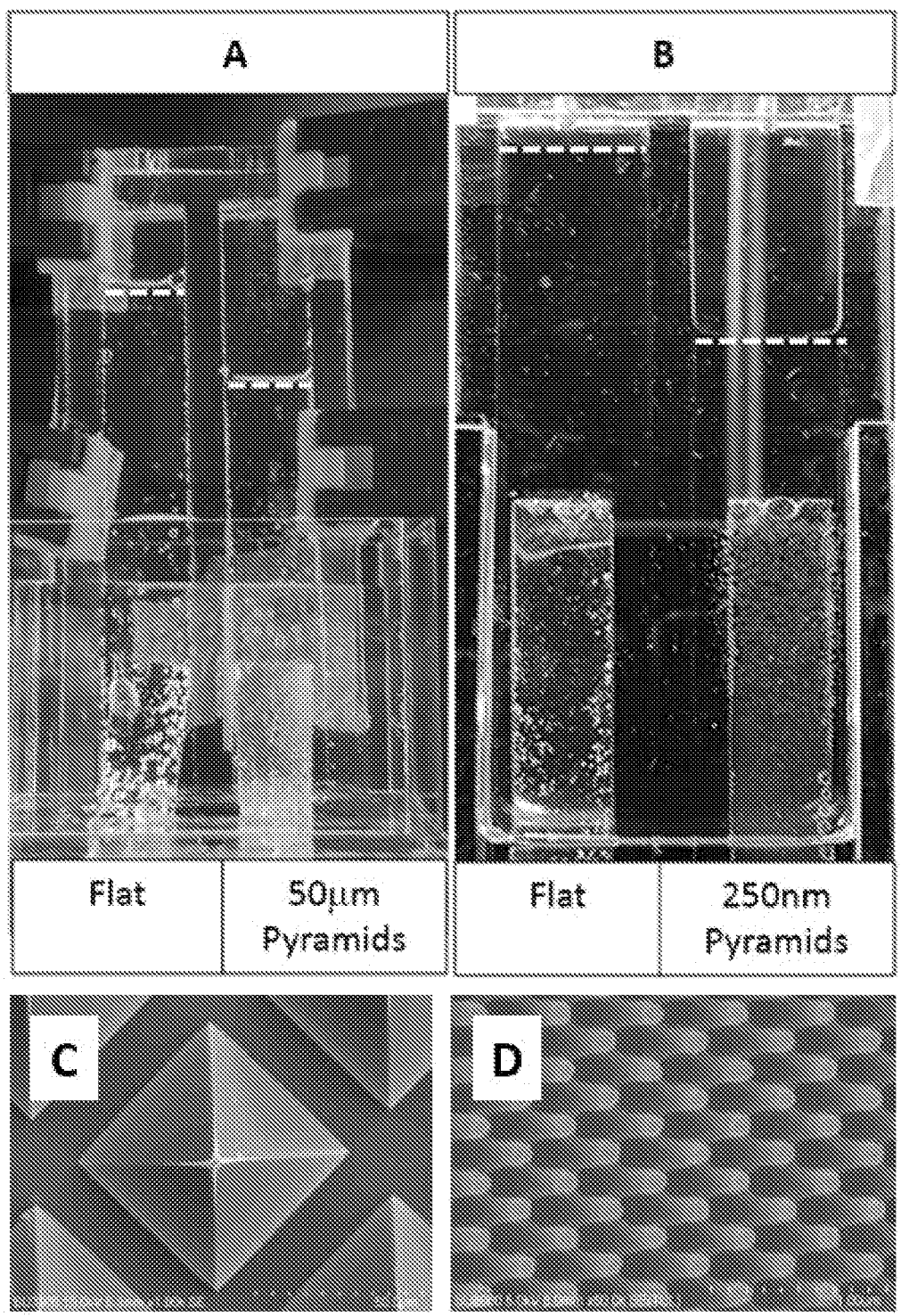
FIG. 18 shows production of hydrogen gas under identical conditions for A) Flat vs 50 µm pyramids, and B) Flat vs 250 nm pyramids. SEM images for each of the pyramids are shown in C (50 µm pyramid) and D (250 nm pyramid) below.

Method: $K_2(PtCl_4)$ (6 mml) in PBS buffer was electrochemically deposited onto both flat and 3D SAM coated electrodes using chronoamperometry at −0.4V vs Ag/AgCl. The electrodes were setup in the cells shown in FIG. 18, and allowed the hydrogen production of both the 50 µm and 250 nm pyramids to be compared against a flat electrode Results: The setup also enabled the rate of bubbling and the relative size of the bubbles to be examined, and confirmed that the 3D surfaces effectively removed the hydrogen from the tips and did not interfere with production.

Conclusion: The results showed that the 3D surfaces overcome one of the major limitations with hydrogen gas production and efficiently removes hydrogen from the surface.

Example 16

Conversion of $CO_2$ to CO and Formic Acid

Aim: To apply the 3D catalytic surface to the reduction of $CO_2$

Method: A three electrode system was used with nano-Pyramidal structured Au surfaces as the working electrode, Pt as the counter and Ag/AgCl as the reference in PBS buffer. The CVs were performed with and without the addition of $CO_2$ in argon to the solution.

Figure 20:
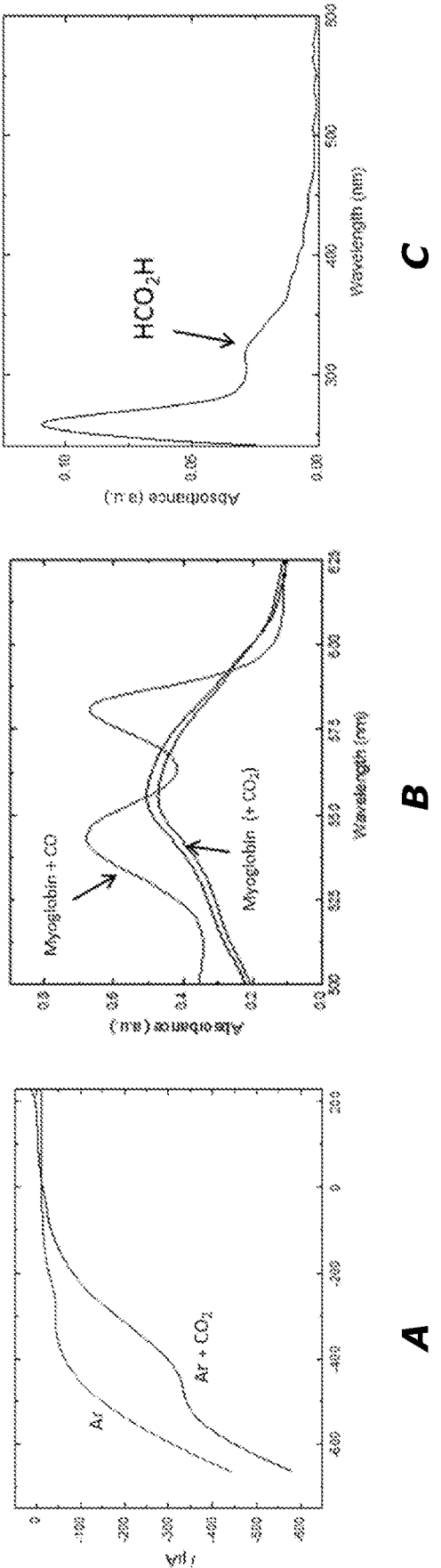
FIG. 20 shows the reduction of $CO_2$. A) shows the CVs for argon (top line) and Argon+$CO_2$ (bottom line), B) and C) show the analysis of the products in the headspace and confirms the appearance of CO and formic acid.

Results: Upon addition of the $CO_2$ gas a distinct yet reversible deflection in the CV was seen as shown in FIG. 20A. Head space analysis confirmed that this corresponded to the production of CO and appearance of the CO-myoglobin complex in the UV-Vis (FIG. 20B), and formic acid by the appearance of the peak at 320 nm in the UV spectrum (FIG. 20C).

Conclusion: The CV clearly shows a peak corresponding to the reduction of nitrogen. The precise identity of all the products is yet to be fully confirmed, however the appearance of a peak in the UV-Vis supports the production of ammonia.

Example 17

Stability of Pt Coated Nano-Pyramid Array by Redox Cycling

Aim: To demonstrate the stability of the Pt coated nano-pyramid array under prolonged continues catalytic conditions using cyclic voltammetry.

Method: Pt catalyst (30 nm) was sputtered nano-pyramidal surfaces. A three electrode system was used with Pt wire as the counter and Ag/AgCl as the reference. The surface was cycled continuously from 200 mV to −300mV for 500 cycles at 10 mV/s to reduce 02 in pH 13 solution.

Figure 22:
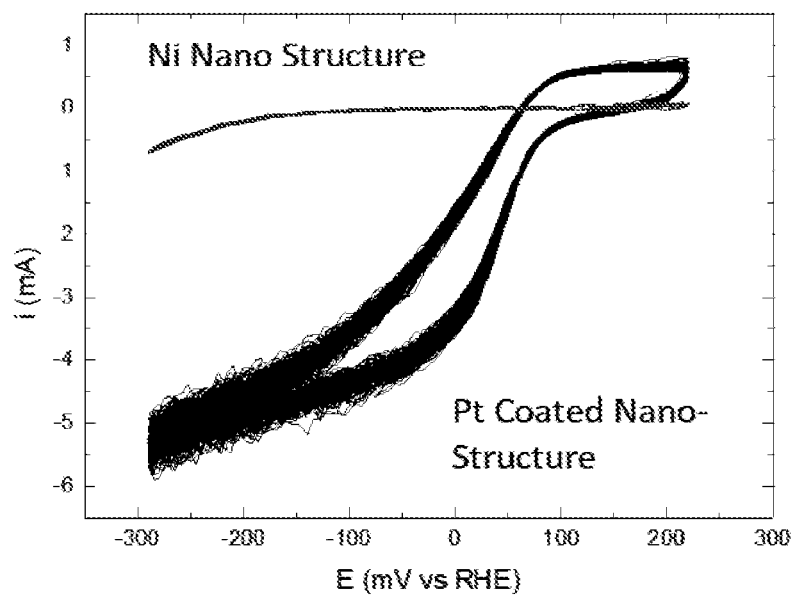
FIG. 22 shows prolonged $O_2$ reduction by Pt coated nano-pyramid surface using cyclic voltammetry.

Results: FIG. 22 showed no measurable degradation of Pt activity as the maximum $O_2$ reduction current was constant at −300 mV.

Conclusion: under prolonged cyclic voltammetry the surface showed no sign of degradation. If the catalyst was degrading one would observe a decrease in catalytic current towards the base Ni substrate.

Example 18

Stability of Pt Coated Nano-Pyramid Array by Constant Current

Aim: To demonstrate the stability of the Pt coated nano-pyramid array electrode under prolonged continues catalytic condition using chronoamperometry.

Method: Pt catalyst (30 nm) was sputtered nano-pyramidal surfaces. A three electrode system was used with Pt wire as the counter and Ag/AgCl as the reference. A reductive potential −150 mV was applied for over 2.5 days to continuously reduce $O_2$ in pH 13 solution.

Figure 23:
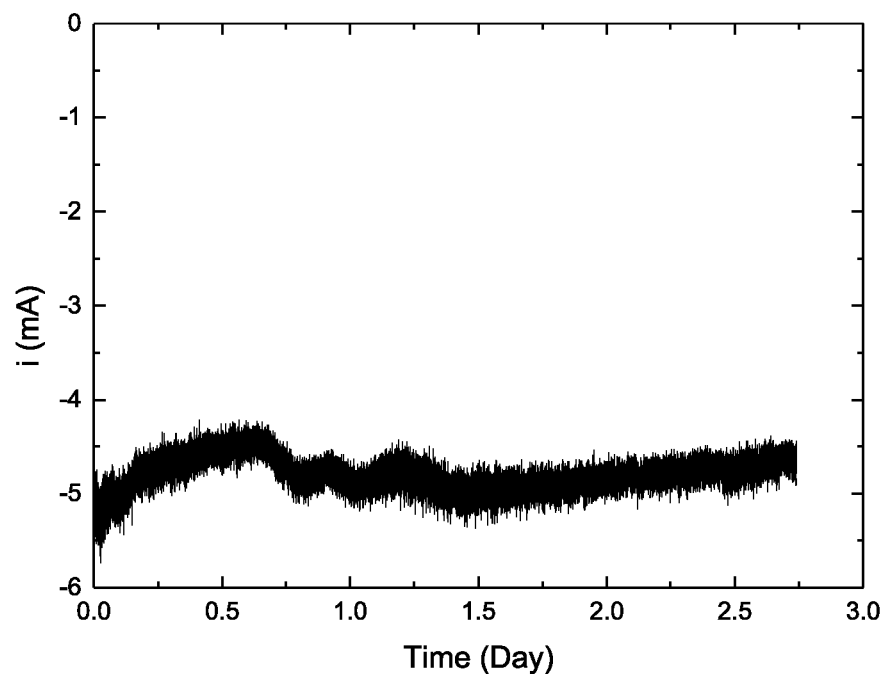
FIG. 23 Shows prolonged $O_2$ reduction by Pt coated nano-pyramid surface using Chronoamperometry.

Results: FIG. 23 showed no measurable degradation of Pt activity as the maximum $O_2$ reduction current was constant at −5 mA.

Conclusion: under prolonged catalytic process the surface showed no sign of degradation.

Example 19

Controlling the Deposition of the Catalyst

Aim: To demonstrate that the 3D structures allowed the amount of catalyst to be deposited onto the tips in a controlled fashion.

Method: Surface structures with a gold layer were cleaned using reactive ion etching (RIE) with $O_2$ plasma (2 min) and immersed into a Platinum (IV) chloride (1 mM) solution in PBS. The growth of Pt meso-particles was carried out using a square wave potential as follows; a reductive potential (−500 mV) was applied to reduce Pt(II) to Pt (0) on the surface for 15s, followed a 15 second oxidative potential (300 mV) to stop the process. This cycle was continued until the desired amount of deposited Pt was obtained.

Figure 24:
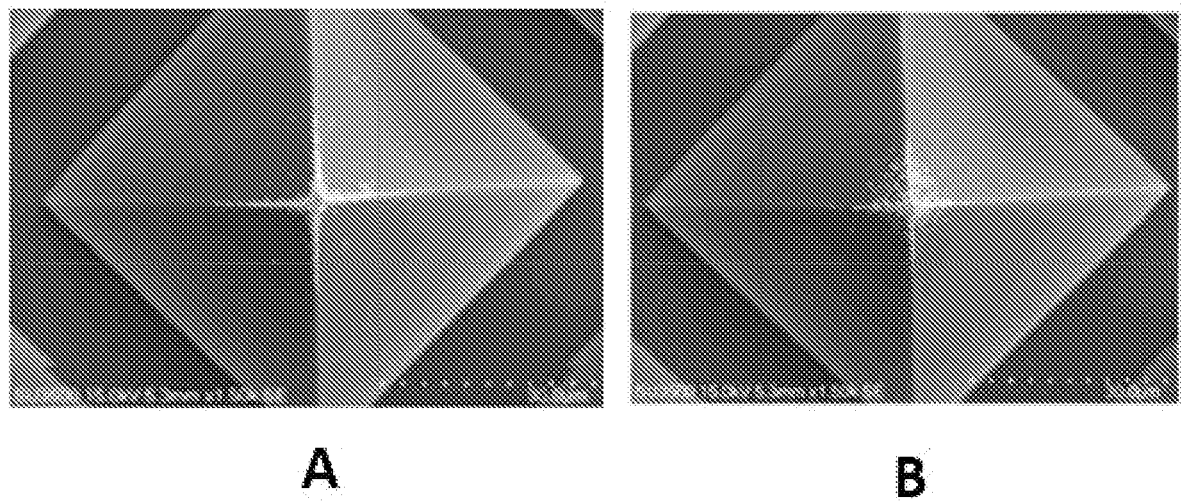
FIG. 24 shows controlled deposition of Pt catalyst at the apex of the pyramids using A) 5 pulses and B) 10 pulses.

Results: The Pt deposition occurred predominantly at or about the apex of the surface structures as shown in FIG. 24 for 5 pulses (FIG. 24A) and 10 pulses (FIG. 24B). As shown in the figure, the amount of Pt deposited clearly increases proportionally to the number of pulses on and around the tip.

Conclusion: The ability to accurately locate and control the amount of catalyst is critical to minimising the catalyst material required to be deposited onto the surface, and hence minimising the production cost of the catalytic system.

While not wishing to be bound by theory, it is believed the invention is based on one or more of the following non-limiting concepts:

Exchange Current Density

Important kinetic parameter representing the electrochemical reaction rate at equilibrium and determines how rapidly the electrochemical reaction can occur. The exchange current density of an electrochemical reaction depends on the reaction and on the electrode surface on which the electrochemical reaction occurs and therefore, it is related to the true electrode area and to the reactant concentration.

3D surfaces have higher exchange current density than flat electrode

Electron Transfer Coefficient

Defined as the fraction of the electrostatic potential energy affecting the reduction rate in an electrode reaction:

3D surfaces have higher electron transfer coefficient than flat surface

Activation Energy

Lowering the activation lowers the energy cost for given catalytic process, therefore decreasing the thermodynamic cost 3D surface has lower over potential than a flat surface In Conclusion the Results show that the smaller the dimensions of the tip, the greater the effect at the tip both with and without any additional catalytic coating The size of the tips makes them ideal for application within a microfluidic setting both for catalytic separation and recombination of a range of carbon, oxygen and nitrogen contain species. It would be expected that a MF environment would increase the reaction rate and overall efficiency of conversion.

Both microfluidic and non-microfluidic setting could be used for setting up a cascade of catalytic processes.

The invention claimed is:

1. A method of catalysing an electrochemical redox reaction of an active species in a conductive solution, the method comprising:
  a. providing an electrocatalyst array comprising:
   i. a support substrate;
   ii. surface structures protruding from the support substrate wherein the surface structures include an electrocatalyst;
   iii. a functional surface on the electrocatalyst, wherein the functional surface is on an upper portion of the surface structures and wherein the functional surface is adapted to contact the active species in the conductive solution;
  b. exposing the surface structures to the conductive solution and comprising a counter electrode therein; and
  c. establishing a current or a voltage between the electrocatalyst and the counter electrode such that a charge density is focussed at the functional surface and the active species undergoes the electrochemical redox reaction following contact with the functional surface,
  wherein the voltage is sufficient to cause a multi-electron oxidation or multi-electron reduction of the active species;
  wherein the surface structures are uniformly sized and have edges and/or apices comprising the catalyst
  wherein when the uniformly sized surface structures are of a micrometer scale a first product is produced, wherein when the uniformly sized surface structures are of a nanometer scale a second product is produced, wherein the first and second products are different; and
  wherein the second product requires a higher order electron process compared to producing the first product.

2. The method of claim 1, wherein the surface structures are of one or more of the following:
   i. a same or different or dissimilar heights from a surface of the support substrate,
   ii. a same or different or dissimilar geometry of shape with respect to one or more other surface structures,
   iii. of a regular or irregular geometry,
   iv. are equally or unequally spaced from each other,
   v. are of the same or different or dissimilar density, or
   vi. a grouping of surface structures comprising a plurality of the surface structures of any one of i–v.

3. The method of claim 1, wherein the surface structures are uniformly sized and have substantially a same geometry.

4. The method of claim 1, wherein the surface structures are a same material as the support substrate.

5. The method of claim 1, wherein the surface structures are integral with the support substrate.

6. The method of claim 1,
   wherein the redox reaction is a 2 or more electron process, or
   wherein the redox reaction is a 4 or more electron process, or
   wherein the redox reaction is a 6 or more electron process, or
   wherein the redox reaction is an 8 electron or higher process.

7. The method of claim 1, wherein the functional surface is at or about an apex of the surface structures and wherein a width of the apex of each surface structure is between about 1 nm to about 5000 µm.

8. The method of claim 1, wherein a width of the surface structures on the micrometer scale where the surface structures join the support substrate are about 5 µm to about 500 µm and/or a width of the surface structures on the nanometer scale where the surface structures join the support substrate are about 25 nm to about 5000 nm.

9. The method of claim 1,
   wherein the method catalyses gas formation, wherein the voltage applied is sufficient to cause a multi-electron oxidation or multi-electron reduction of the active species;
   wherein the surface structures are uniformly sized and have edges and/or apices comprising the catalyst; and
   wherein a rate of gas formation is increased by at least a factor of 1.5 times compared to a same electrocatalyst array without the uniformly sized surface structures protruding from a surface of the support substrate.

10. The method of claim 1, wherein the redox reaction encompasses a number of steps, and wherein an intermediate is not isolated.

11. The method of claim 1, wherein the redox reaction is selected from one or more of the following:
   hydrogen evolution from water;
   oxygen evolution from water;
   hydrogen evolution from protons;
   hydrogen oxidation to water;
   hydrogen oxidation to hydrogen peroxide;
   oxygen reduction to water;
   oxygen reduction to peroxide;
   carbon dioxide to carbon monoxide;
   carbon dioxide to methanol;
   carbon dioxide to a carboxylic acid, wherein the carboxylic acid is selected from a group comprising formic acid;
   carbon dioxide to aldehyde and/or ketone;
   carbon dioxide to methane, ethane, propane and/or higher order carbon chains up to $C_{21}$;
   methane oxidation to methanol;
   nitrogen to hydrazine;
   nitrogen to ammonia;
   ammonia split to hydrogen and nitrogen;
   methane to methanol;
   nitrate to nitrogen; or
   nitrate to ammonia.

12. The method of claim 1, wherein the electrocatalyst is suspended in a matrix surrounding tips of the surface structures.

13. The method of claim 1, wherein the electrocatalyst comprises a transition metal, an alloy, an organometallic complex, an organometallic complex including the transition metal, or an organic material that is able to be oxidised or reduced.

14. The method of claim 1, wherein the surface structures are uniformly sized, and wherein dimensions of the uniformly sized surface structures are selected to change a redox product collected.

15. The method of claim 1, wherein the electrocatalyst is a first electrocatalyst, and wherein the method allows for substitution to a second electrocatalyst that is of a relatively lower activity electrocatalyst which is of a relatively lower cost without loss of effectiveness in producing a product of the electrochemical redox reaction.

16. The method of claim 1, wherein the active species is electrochemically modified following contact with the functional surface and a thermodynamic efficiency and a kinetic efficiency of the electrochemical modification is improved compared to a corresponding flat electrode.

17. The method of claim 1, wherein electrochemical activation of the electrocatalyst occurs at a substantially greater rate at the functional surface than electrochemical activation occurs at another surface position on an electrocatalyst layer.

18. The method of claim 1, wherein an amount of energy required to drive the electrochemical redox reaction is decreased compared to a flat electrocatalyst.

19. The method of claim 1, wherein the surface structures on a nanometer scale have a width or length where the surface structures join the support substrate of about 25 nm to about 5000 nm or the surface structures on a micrometer scale have a width or length where the surface structures join the support substrate of about 5 µm to about 500 µm.

20. The method of claim 19, wherein an amount of energy required to drive the electrochemical redox reaction is decreased when surface structures on a nanometer scale are used in the method compared to when surface structures on a micrometer scale are used in the method.

21. The method of claim 1, wherein when the structures are of a micrometer scale a first product or product ratio is produced, wherein when the surface structures are of a nanometer scale a second product or product ratio is produced, wherein the first and second products are different from each other, and wherein the first and second product ratios are different from each other.

22. The method of claim 21, wherein the second product requires a higher order electron process compared to producing the first product.

23. A method of catalysing an electrochemical redox reaction of an active species in a conductive solution, the method comprising:
   a. providing an electrocatalyst array comprising:
      i. a support substrate;
      ii. surface structures protruding from the support substrate wherein the surface structures include an electrocatalyst;

iii. a functional surface on the electrocatalyst, wherein the functional surface is on an upper portion of the surface structures and wherein the functional surface is adapted to contact the active species in the conductive solution;
b. exposing the surface structures to the conductive solution and comprising a counter electrode therein; and
c. establishing a current or a voltage between the electrocatalyst and the counter electrode such that a charge density is focussed at the functional surface and the active species undergoes the electrochemical redox reaction following contact with the functional surface,
wherein when the structures are of a micrometer scale a first product or product ratio is produced, wherein when the surface structures are of a nanometer scale a second product or product ratio is produced, wherein the first and second products are different from each other, and wherein the first and second product ratios are different from each other.

24. The method of claim 23, wherein the second product requires a higher order electron process compared to producing the first product.

25. The method of claim 23, wherein the surface structures are of one or more of the following:
   i. a same or different or dissimilar heights from a surface of the support substrate,
   ii. a same or different or dissimilar geometry of shape with respect to one or more other surface structures,
   iii. of a regular or irregular geometry,
   iv. are equally or unequally spaced from each other,
   v. are of the same or different or dissimilar density, or
   vi. a grouping of surface structures comprising a plurality of the surface structures of any one of i–v.

26. The method of claim 23, wherein the surface structures are uniformly sized and have substantially a same geometry.

27. The method of claim 23, wherein the surface structures are a same material as the support substrate.

28. The method of claim 23, wherein the surface structures are integral with the support substrate.

29. The method of claim 23,
   wherein the redox reaction is a 2 or more electron process, or
   wherein the redox reaction is a 4 or more electron process, or
   wherein the redox reaction is a 6 or more electron process, or
   wherein the redox reaction is an 8 electron or higher process.

30. The method of claim 23, wherein the functional surface is at or about an apex of the surface structures and wherein a width of the apex of each surface structure is between about 1 nm to about 5000 μm.

31. The method of claim 23,
   wherein the voltage is sufficient to cause a multi-electron oxidation or multi-electron reduction of the active species;
   wherein the surface structures are uniformly sized and have edges and/or apices comprising the catalyst;
   wherein when the uniformly sized surface structures are of a micrometer scale a first product is produced, wherein when the uniformly sized surface structures are of a nanometer scale a second product is produced, wherein the first and second products are different; and
   wherein the second product requires a higher order electron process compared to producing the first product.

32. The method of claim 31, wherein a width of the surface structures on the micrometer scale where the surface structures join the support substrate are about 5 μm to about 500 μm and/or a width of the surface structures on the nanometer scale where the surface structures join the support substrate are about 25 nm to about 5000 nm.

33. The method of claim 23,
   wherein the method catalyses gas formation, wherein the voltage applied is sufficient to cause a multi-electron oxidation or multi-electron reduction of the active species;
   wherein the surface structures are uniformly sized and have edges and/or apices comprising the catalyst; and
   wherein a rate of gas formation is increased by at least a factor of 1.5 times compared to a same electrocatalyst array without the uniformly sized surface structures protruding from a surface of the support substrate.

34. The method of claim 23, wherein the redox reaction encompasses a number of steps, and wherein an intermediate is not isolated.

35. The method of claim 23, wherein the redox reaction is selected from one or more of the following:
   hydrogen evolution from water;
   oxygen evolution from water;
   hydrogen evolution from protons;
   hydrogen oxidation to water;
   hydrogen oxidation to hydrogen peroxide;
   oxygen reduction to water;
   oxygen reduction to peroxide;
   carbon dioxide to carbon monoxide;
   carbon dioxide to methanol;
   carbon dioxide to a carboxylic acid, wherein the carboxylic acid is selected from a group comprising formic acid;
   carbon dioxide to aldehyde and/or ketone;
   carbon dioxide to methane, ethane, propane and/or higher order carbon chains up to $C_{21}$;
   methane oxidation to methanol;
   nitrogen to hydrazine;
   nitrogen to ammonia;
   ammonia split to hydrogen and nitrogen;
   methane to methanol;
   nitrate to nitrogen; or
   nitrate to ammonia.

36. The method of claim 23, wherein the electrocatalyst is suspended in a matrix surrounding tips of the surface structures.

37. The method of claim 23, wherein the electrocatalyst comprises a transition metal, an alloy, an organometallic complex, an organometallic complex including the transition metal, or an organic material that is able to be oxidised or reduced.

38. The method of claim 23, wherein the surface structures are uniformly sized, and wherein dimensions of the uniformly sized surface structures are selected to change a redox product collected.

39. The method of claim 23, wherein the electrocatalyst is a first electrocatalyst, and wherein the method allows for substitution to a second electrocatalyst that is of a relatively lower activity electrocatalyst which is of a relatively lower cost without loss of effectiveness in producing a product of the electrochemical redox reaction.

40. The method of claim 23, wherein the active species is electrochemically modified following contact with the functional surface and a thermodynamic efficiency and a kinetic efficiency of the electrochemical modification is improved compared to a corresponding flat electrode.

41. The method of claim 23, wherein electrochemical activation of the electrocatalyst occurs at a substantially greater rate at the functional surface than electrochemical activation occurs at another surface position on an electrocatalyst layer.

42. The method of claim 23, wherein an amount of energy required to drive the electrochemical redox reaction is decreased compared to a flat electrocatalyst.

43. The method of claim 23, wherein the surface structures on a nanometer scale have a width or length where the surface structures join the support substrate of about 25 nm to about 5000 nm or the surface structures on a micrometer scale have a width or length where the surface structures join the support substrate of about 5 μm to about 500 μm.

44. The method of claim 43, wherein an amount of energy required to drive the electrochemical redox reaction is decreased when surface structures on a nanometer scale are used in the method compared to when surface structures on a micrometer scale are used in the method.

45. A method of catalysing an electrochemical redox reaction of an active species in a conductive solution, the method comprising:
  a. providing an electrocatalyst array comprising:
    i. a support substrate;
    ii. surface structures protruding from the support substrate wherein the surface structures include an electrocatalyst;
    iii. a functional surface on the electrocatalyst, wherein the functional surface is on an upper portion of the surface structures and wherein the functional surface is adapted to contact the active species in the conductive solution;
  b. exposing the surface structures to the conductive solution and comprising a counter electrode therein; and
  c. establishing a current or a voltage between the electrocatalyst and the counter electrode such that the a charge density (voltage or current) is focussed at the functional surfaces and the active species undergoes the electrochemical redox reaction following contact with the functional surfaces,
  wherein the voltage is sufficient to cause a multi-electron oxidation or multi-electron reduction of the active species;
  wherein a plurality of the surface structures are uniformly sized and have edges and/or apices comprising the catalyst,
  wherein when the uniformly sized surface structures are of a micrometer scale a first product is produced, wherein when the uniformly sized surface structures are of a nanometer scale a second product is produced, wherein the first and second products are different; and
  wherein the second product requires a higher order electron process compared to producing the first product,
  wherein the width of the surface structures on the micrometer scale where the surface structures join the support substrate are about 5 μm to about 500 μm and/or a width of the surface structures on the nanometer scale where the surface structures join the support substrate are about 25 nm to about 5000 nm,
  wherein when the structures are of a micrometer scale a first product or product ratio is produced, wherein when the surface structures are of a nanometer scale a second product or product ratio is produced, wherein the first and second products are different from each other, and wherein the first and second product ratios are different from each other;
  wherein the second product requires a higher order electron process compared to producing the first product.

46. The method of claim 45,
  wherein the method catalyses gas formation, wherein the voltage applied is sufficient to cause a multi-electron oxidation or multi-electron reduction of the active species;
  wherein the surface structures are uniformly sized and have edges and/or apices comprising the catalyst; and
  wherein a rate of gas formation is increased by at least a factor of 1.5 times compared to a same electrocatalyst array without the uniformly sized surface structures protruding from a surface of the support substrate.

* * * * *